US011857982B2

(12) United States Patent
Melling et al.

(10) Patent No.: US 11,857,982 B2
(45) Date of Patent: Jan. 2, 2024

(54) APPARATUS WITH AXIALLY MOVABLE WALL MEMBER FOR SEPARATING COMPONENTS OF A FLUID STREAM

(71) Applicant: GM INNOVATIONS LIMITED, Glasgow (GB)

(72) Inventors: Gerard Melling, Wigan (GB); Alan Suttie, Glasgow (GB); Brian Loudon, Glasgow (GB)

(73) Assignee: GM INNOVATIONS LIMITED, Glasgow (GB)

(*) Notice: Subject to any disclaimer, the term of this patent is extended or adjusted under 35 U.S.C. 154(b) by 1088 days.

(21) Appl. No.: 16/488,114

(22) PCT Filed: Feb. 26, 2018

(86) PCT No.: PCT/EP2018/054681
§ 371 (c)(1),
(2) Date: Aug. 22, 2019

(87) PCT Pub. No.: WO2018/154115
PCT Pub. Date: Aug. 30, 2018

(65) Prior Publication Data

US 2020/0230615 A1 Jul. 23, 2020

(30) Foreign Application Priority Data

Feb. 27, 2017 (GB) .................................... 1703110
Jan. 29, 2018 (GB) .................................... 1801414

(51) Int. Cl.
*B04B 11/02* (2006.01)
*B04B 1/04* (2006.01)
(Continued)

(52) U.S. Cl.
CPC ................ *B04B 11/02* (2013.01); *B04B 1/04* (2013.01); *B04B 1/12* (2013.01); *B04B 11/06* (2013.01); *B04C 3/06* (2013.01); *B04C 2003/006* (2013.01)

(58) Field of Classification Search
CPC .. B04B 11/02; B04B 1/04; B04B 1/12; B04B 11/06; B04B 2013/006; B04B 13/00;
(Continued)

(56) References Cited

U.S. PATENT DOCUMENTS 927,059 A 7/1909 Max
1,640,707 A * 8/1927 Laughlin .................. B04B 1/12 494/67
(Continued)

FOREIGN PATENT DOCUMENTS

CH 655017 A5 3/1986
CN 203990941 U 12/2014
(Continued)

OTHER PUBLICATIONS

International Search Report and Written Opinion of the International Searching Authority for PCT/EP2018/054681 dated Oct. 5, 2018.

(Continued)

*Primary Examiner* — Walter D. Griffin
*Assistant Examiner* — Shuyi S. Liu
(74) *Attorney, Agent, or Firm* — Heslin Rothenberg Farley & Mesiti P.C.

(57) ABSTRACT

A centrifugal separator apparatus for separating components of a fluid stream;

the apparatus comprising a support structure and a centrifugal separator unit rotatably mounted on the support structure so as to be rotatable about a rotational axis extending through the centrifugal separator unit;

(Continued)

a drive element for driving rotation of the centrifugal separator unit;
wherein the centrifugal separator unit comprises a centrifugal separation chamber having an inlet which is connected or connectable to a source of fluid requiring separation, a first outlet for collecting a higher density component of the fluid stream, and a second outlet for collecting a lower density component of the fluid stream;
the first outlet being connected or connectable to a first collector for collecting the higher density component and the second outlet being connected or connectable to a second collector for collecting the lower density component;
the centrifugal separation chamber comprising a curved or inclined guide surface for guiding flow of the fluid from the inlet in a radially outward direction;
wherein the centrifugal separator unit is provided with a wall member which is axially movable to provide a selected degree of occlusion of the first outlet and thereby control flow of the higher density component through the first outlet.

16 Claims, 14 Drawing Sheets

(51) Int. Cl.

| | |
|---|---|
| ***B04B 1/12*** | (2006.01) |
| ***B04B 11/06*** | (2006.01) |
| ***B04C 3/06*** | (2006.01) |
| ***B04C 3/00*** | (2006.01) |

(58) Field of Classification Search
CPC ................ B04C 3/06; B04C 2003/006; B04C 2009/007; B04C 3/00
USPC ........ 494/1, 2, 3, 10, 38, 39, 40, 41, 56, 57, 494/58, 59
See application file for complete search history.

(56) References Cited

U.S. PATENT DOCUMENTS 2,532,792 A * 12/1950 Nils ........................ B04B 11/02 494/35
3,463,318 A * 8/1969 Alexander ................ B04B 7/04 210/376
3,810,347 A 5/1974 Kartinen
3,879,286 A 4/1975 Berriman
4,411,645 A 10/1983 Tenthoff
4,536,285 A * 8/1985 Karlsson .............. B01D 21/305 210/512.1
4,589,865 A * 5/1986 Gullers ..................... B04B 1/08 494/26
4,898,571 A 2/1990 Epper et al.
5,062,955 A 11/1991 Sciamanna
5,707,519 A 1/1998 Miller et al.
5,904,840 A 5/1999 DiBella
7,727,386 B2 6/2010 DiBella et al.
2003/0006188 A1 1/2003 Constantine et al.
2006/0089247 A1 4/2006 Ostkamp
2009/0131236 A1 5/2009 Bech et al.
2013/0310242 A1 11/2013 Madsen et al.
2015/0190817 A1* 7/2015 Pieralisi .................. B04B 11/04 494/48
2015/0202635 A1* 7/2015 Spiegel ..................... B04B 9/12 494/14
2016/0074880 A1 3/2016 Thorwid et al.
2016/0271626 A1* 9/2016 Bergström ................ B04B 1/08
2016/0318041 A1 11/2016 Melling
2021/0039116 A1 2/2021 Melling et al.
2021/0363041 A1 11/2021 Melling et al.

FOREIGN PATENT DOCUMENTS

| | | | |
|---|---|---|---|
| DE | 155981 | C | 11/1904 |
| EP | 2868210 | A1 | 5/2015 |
| FR | 2556241 | A1 | 6/1985 |
| FR | 2652762 | A1 | 4/1991 |
| FR | 2681259 | A1 | 3/1993 |
| GB | 1328683 | | 8/1973 |
| GB | 1440592 | | 6/1976 |
| GB | 1476670 | A | 6/1977 |
| GB | 1526509 | A | 9/1978 |
| GB | 2206508 | A | 1/1989 |
| JP | S5127696 | A | 3/1976 |
| JP | H0368407 | A | 3/1991 |
| SU | 1726049 | A1 | 4/1992 |
| WO | 97/04874 | A1 | 2/1997 |
| WO | 02/056999 | A1 | 7/2002 |
| WO | 03070349 | A1 | 8/2003 |
| WO | 03/074185 | A1 | 9/2003 |
| WO | 2006112820 | A1 | 10/2006 |
| WO | 2007/011233 | A1 | 1/2007 |
| WO | 2011/028122 | A1 | 3/2011 |
| WO | 2014/009161 | A2 | 1/2014 |
| WO | 2014/012962 | A1 | 1/2014 |
| WO | 2015/082502 | A1 | 6/2015 |
| WO | 2015/082505 | A1 | 6/2015 |
| WO | 2015/122919 | A1 | 8/2015 |

OTHER PUBLICATIONS

Great Britain Search Report for GB1703110.5 dated Jul. 13, 2017.
Great Britain Search Report for GB1801414.2 dated Aug. 9, 2018.

* cited by examiner

APPARATUS WITH AXIALLY MOVABLE WALL MEMBER FOR SEPARATING COMPONENTS OF A FLUID STREAM

CROSS REFERENCE TO RELATED APPLICATIONS

This application is a national stage filing under section 371 of International Application No. PCT/EP2018/054681, filed on Feb. 26, 2018, and published on Aug. 30, 2018 as WO 2018/154115, which claims priority to Great Britain Application No. 1801414.2, filed on Jan. 29, 2018 and Great Britain Application No. 1703110.5, filed on Feb. 27, 2017. The entire contents of WO 2018/154115 are hereby incorporated herein by reference.

This invention relates to an apparatus for separating components of a fluid stream, for example a stream of liquid such as water.

BACKGROUND OF THE INVENTION

There is a need for an apparatus for separating components a fluid stream that is robust, of simple construction, has a high throughput, and is readily portable. Such an apparatus is particularly desirable for providing clean water in field situations and, in particular, disaster relief situations, or for separating oil from water in oil spillage situations, or in removing particulate materials from the liquids produced by fracking.

WO 2015/082502 (GM Innovations Limited) discloses an apparatus for removing impurities from a fluid stream. The apparatus makes use of centrifugal separation for separating suspended materials from a fluid.

SUMMARY OF THE INVENTION

The present inventors have devised an improved apparatus for separating components of a fluid stream. The improved apparatus has a greater separation efficiency and provides means for adjusting the apparatus during its operation to further improve its efficiency.

Accordingly, in a first aspect, the invention provides a centrifugal separator apparatus for separating components of a fluid stream;

- the apparatus comprising a support structure and a centrifugal separator unit rotatably mounted on the support structure so as to be rotatable about a rotational axis extending through the centrifugal separator unit;
- a drive element for driving rotation of the centrifugal separator unit;
- wherein the centrifugal separator unit comprises a centrifugal separation chamber having an inlet which is connected or connectable to a source of fluid requiring separation, a first outlet for collecting a higher density component of the fluid stream, and a second outlet for collecting a lower density component of the fluid stream;
- the first outlet being connected or connectable to a first collector for collecting the higher density component and the second outlet being connected or connectable to a second collector for collecting the lower density component;
- the centrifugal separation chamber comprising a curved or inclined guide surface for guiding flow of the fluid from the inlet in a radially outward direction;
- wherein the centrifugal separator unit is provided with a wall member which is axially movable to provide a selected degree of occlusion of the first outlet and thereby control flow of the higher density component through the first outlet.

In the context of the application, the term "axially movable" refers to movement along or in the direction of the rotational axis.

"Radially" refers to a direction towards or away from the rotational axis. The direction can be orthogonal to the rotational axis or it can be at an angle between 0° and 90° with respect to the rotational axis. Thus, "radially outwardly" refers to a direction away from the rotational axis whereas "radially inwardly" refers to a direction towards the rotational axis.

The rotational axis can be substantially horizontal, or substantially vertical or at any desired angle between horizontal and vertical, with respect to the ground of the surface upon which the apparatus is placed in use.

In some embodiments, the rotational axis is substantially horizontal (for example within ±3° of horizontal).

In other embodiments, the rotational axis is substantially vertical (for example within ±3° of vertical).

In other embodiments, the rotational axis is at an angle between horizontal and vertical.

The centrifugal separator unit comprises a centrifugal separation chamber inside which centrifugal separation of the components of the fluid stream takes place. Upon entering the centrifugal separation chamber, the centrifugal effect created by the rotation of the centrifugal separator unit leads to the higher density components of the fluid moving outwardly towards the periphery of the chamber to a greater extent than the lower density components thereby resulting in separation of the higher and lower density components. The higher density components pass out through the first outlet whereas the lower density components pass out through the second outlet.

It will be appreciated that the terms "higher density components" and "lower density components" are relative terms and do not imply any particular density values. For example, in fluid comprising a water/oil mixture, the water will typically be a higher density component and the oil a lower density component. By contrast, in a fluid comprising water and entrained particulate materials (e.g. sand or grit), the sand or grit particles would typically be the higher density components and the water would be the lower density component.

The terms "first outlet" and "second outlet" are used herein to designate the nature of the components that pass through the outlet. There may be only one "first outlet" or there may be a plurality of "first outlets". For example, the centrifugal separation chamber may have a plurality of openings through which the higher density components may pass, each of the openings constituting a "first opening".

Similarly, there may be only one "second outlet" or there may be a plurality of "second outlets". For example, the centrifugal separation chamber may have a plurality of openings through which the lower density components may pass, each of the openings constituting a "second opening".

The centrifugal separation chamber has an inlet which is connected or connectable to a source of fluid requiring separation. There may be only one such inlet, or there may be present a plurality of openings into the separation chamber, each of which constitutes an inlet.

References to the separation of components of the fluid stream can mean complete separation or partial separation. For example, when the fluid stream comprises water and entrained particulate materials (e.g. sand or grit), the components passing out of the first outlet will typically comprise sand or grit together with some water whereas the components passing out through the second outlet may consist of water and dissolved materials, but no sand and grit. When the fluid comprises a water/oil mixture, the components passing out through the first outlet may consist predominantly of water and any dissolved substances and, depending on the extent of separation, some oil, and the components passing out of the second outlet may consist predominantly of oil but with some water and dissolved substances being present.

It will be appreciated that the extent of separation of the components of the fluid stream will typically depend on the geometry of the centrifugal separation chamber and speed of rotation of the centrifugal separator unit. Thus, for a fluid comprising a water/oil mixture, the speed of rotation of the centrifugal separator unit may be selected so that substantially oil-free water passes out of the first outlet or substantially water-free oil passes out through the second outlet.

The centrifugal separator chamber comprises a guide surface. The guide surface extends circumferentially around the chamber and is typically coaxial with the rotational axis of the apparatus. The guide surface is arranged and shaped such that it directs fluid from the inlet towards the outermost regions of the centrifugal separation chamber, where centrifugal forces are greatest. The guide surface is curved or inclined to guide flow of the fluid from the inlet in a radially outward direction. The curved or inclined guide surface reduces turbulence within the chamber and facilitates more laminar flow of the fluid through the chamber thereby improving the efficiency of separation of the components of the fluid.

The guide surface may be positioned radially outwardly with respect to the inlet; for example, the guide surface may surround the inlet. Therefore, the fluid passes inside of the guide surface (i.e. radially inwardly of the guide surface). The guide surface may thus define a radially outer boundary of the centrifugal separation chamber.

In one embodiment, the guide surface is inclined. Thus, for example the guide surface can be substantially conical or substantially frustoconical. In this embodiment, the radially outer boundary of the centrifugal separation chamber is therefore substantially conical or substantially frustoconical in shape.

Alternatively, the guide surface may be positioned downstream of the inlet. Therefore, the fluid passes outside of the guide surface (i.e. radially outwardly of the guide surface).

In one embodiment, the centrifugal separation chamber comprises inner and outer curved or inclined guide surfaces that are radially spaced apart so that the chamber takes the form of an annular channel between the inner and outer guide surfaces. The inner and outer guide surfaces are preferably spaced apart in a manner such that the cross-sectional area of the annular channel is substantially constant along the length of the channel. This further assists in reducing turbulence and thereby facilitates more laminar flow of the fluid through the chamber.

In one embodiment, the annular channel comprises:

(i) an upstream region which is radially outwardly inclined and is adjacent the inlet of the centrifugal separation chamber;

(ii) a centre region wherein the inner and outer guide surfaces have a substantially constant radius along the length of the centre region; and (iii) a downstream region which is a radially inwardly inclined region leading to the first and second outlets.

In this embodiment, the axially movable wall member can take the form of a divider blade located in the downstream region, the divider blade serving to divide the fluid stream into inner and outer streams, the outer stream comprising the higher density components being directed to the first outlet and the inner stream comprising the lower density components being directed to the second outlet.

The divider blade is axially movable within the downstream region of the annular channel. The divider blade is typically configured so that when it is moved in an upstream direction (i.e. against the direction of flow of the fluid), a leading edge of the blade moves closer to the inner guide surface thereby reducing the flow of fluid to the second outlet and increasing the flow of fluid to the first outlet. When the divider blade thus configured is moved in the reverse direction (i.e. in the same direction as the fluid stream), the leading edge of the blade moves closer to the outer guide surface thereby increasing the flow of fluid to the second outlet and reducing the flow of fluid to the first outlet. Thus, by varying the axial position of the divider blade, the relative volumes of fluid directed to the first and second outlets can be varied to enable fractions of a required density to be collected.

When the axially movable wall member takes the form of a divider blade, it is typically of conical or frustoconical form so as to fit into the downstream region of the annular channel.

The blade is preferably shaped to minimise any turbulence imparted to the fluid stream. Accordingly, the end of the blade may take the form of a knife edge or be curved. Additionally, the blade (or at least the leading edge of the blade) may be formed of a hardened material, to minimise damage to the blade caused by particulate matter suspended within the fluid stream.

In the foregoing embodiments, the inner and outer guide surfaces in the upstream region of the channel may converge to an extent necessary to maintain a constant cross sectional area for the channel. In a complementary manner, the inner and outer guide surfaces in the downstream region of the channel may diverge to an extent necessary to maintain a constant cross sectional area for the channel. In the centre region, the inner and outer guide surfaces are substantially parallel.

The centrifugal separator unit is rotatably mounted on the support structure so as to be rotatable about a rotational axis extending through the unit. The centrifugal separator unit may have a central shaft extending along the rotational axis, the central shaft being rotatably mounted on the support structure, and the centrifugal separation chamber surrounding the central shaft.

The central shaft may be of solid non-tubular construction or it may be of tubular or part tubular construction.

In one embodiment, the central shaft is of tubular construction and, for example, has a circular cross section.

When the central shaft is of tubular construction, it may be connected or connectable to the source of fluid requiring separation so that at least part of the interior of the tubular shaft is in fluid communication with the source of fluid. In this embodiment, the tubular shaft may have one or more lateral openings that communicate with the centrifugal separation chamber. Thus, fluid can pass into the tubular shaft and enter the centrifugal separation chamber through the lateral openings. There may, for example, be a plurality of lateral openings and typically these are spaced equidistantly around the circumference of the tubular shaft. In order to prevent fluid from passing along the entire length of the tubular shaft, the shaft may contain a blocking element. The blocking element may be in close proximity to the lateral openings in order to facilitate flow of the fluid into the centrifugal separation chamber and minimise turbulence. The lateral openings are typically elongate and are angled with respect to the rotational axis of the tube. The use of elongate and angled openings is advantageous over the use of circular openings, as they reduce or prevent clogging of the holes and improve fluid flow into the centrifugal separation chamber (i.e. they impart less turbulence to the fluid).

In one embodiment, the centrifugal separation chamber is defined by a frustoconical radially outer wall that surrounds the rotational axis and flares outwardly in a downstream direction and optionally extends into a substantially cylindrical portion, and a downstream end wall comprising the axially movable wall member. In this embodiment, the first outlet is located in the substantially cylindrical portion, where present, or at or adjacent a wide point of the frustoconical radially outer wall. Movement of the axially movable wall member backwards or forwards along the rotational axis serves to increase or reduce the size of the first outlet and thereby control flow of the higher density component through the first outlet. In this embodiment, the centrifugal separation chamber may surround a central tubular shaft, the tubular shaft having a blocking member in the bore thereof to prevent passage of fluid along the entire length of the shaft and having one or more (typically a plurality) of lateral inlet openings through which fluid requiring separation can enter the centrifugal separation chamber. The axially movable wall member may be provided with one or more openings radially inwardly of the outer edge thereof (e.g. adjacent a radially inner edge thereof) that constitute one or more second outlets through which lower density components of the fluid can pass. Alternatively, or additionally, the central tubular shaft may have a second set (of one or more) lateral openings, upstream of the movable wall member, that serve as a second outlet through which the lower density components of the fluid can pass, a blocking member being disposed within the tubular shaft between the lateral inlet openings and the second set of openings. Thus, fluid entering the centrifugal separation chamber is subjected to centrifugal forces such that higher density components of the fluid move to the outer region of the chamber and pass out though the first outlets whereas lower density components of the fluid pass through the openings in the axially movable wall member and/or the second set of lateral openings.

The second set of lateral openings can take the form of slots, e.g. elongate slots, within one or more of which a mounting strut is provided for linking the axially movable wall member to an actuating rod disposed within the interior of the central tubular shaft, the actuating rod being movable backwards and forwards along the rotational axis to move the mounting struts along the slot and hence move the said wall member. For example, there may be three or four slots each of which accommodates a mounting strut.

Where the axially movable wall has openings radially inwardly of the outer edge thereof through which lower density components of the fluid can pass, the tubular shaft may be provided with a third set of (one or more) lateral openings positioned downstream of the moveable wall so that lower density fluid passing through the openings in the axially movable wall can then pass into the interior of the tubular shaft and thereafter on to a collector.

The separator unit is arranged about (i.e. encircles) the rotational axis of rotation. The separator unit may comprise an at least partially hollow shell which contains the components of the separator unit described herein. The separator unit may therefore comprise a hollow or partially hollow central portion and two end portions. In one embodiment, the separator unit comprises a cylindrical central portion and two frustoconical end portions.

In another embodiment, the separator unit has a cylindrical exterior. The inside of the cylinder may additionally be shaped to define the centrifugal separation chamber. For example, part of the interior of the cylinder may have an inclined or curved surface, which may act as the guide surface.

The centrifugal separation chamber may be made from metals, plastics or other durable materials or combinations thereof. In one embodiment, the centrifugal separation chamber is made from stainless steel. The inner surfaces of the centrifugal separator unit which are exposed to the fluid stream are preferably polished to minimise turbulence and promote more laminar flow of the fluid through the apparatus.

In each end wall of the centrifugal separator unit, there may also be one or more openings which serve as or are in fluid communication with the inlet of the centrifugal separation chamber. There may also be openings which serve as or are in fluid communication with one or both of the first and second outlets.

The support structure may comprise mounting units in which the central shaft is rotatably mounted. When the central shaft is tubular or part-tubular, the mounting units may also be connected or connectable to fluid inlet and/or fluid outlet pipes to introduce or remove fluid from the ends of the central shaft. In one embodiment, the mounting units comprise bearing assemblies within which the ends of the central shaft may rotate. The bearing assemblies can be of conventional construction: thus for example they can comprise bearing elements such as roller or needle bearings or an array of ball bearings, which allow rotation of the central shaft through the non-rotating support structure. The mounting units and bearing assemblies may be constructed so as to form labyrinth seals that prevent leakage or fluid from the apparatus.

The mounting units may have a central opening for receiving an end of a fluid feed pipe and an annular recess radially outwardly of the central opening for receiving an end of a tubular central shaft, the annular recess typically being at least partially lined with bearing elements (e.g. as defined above) so as to facilitate rotation of the end of the central tubular shaft therein. The bearings in the mounting unit allow rotation of the tubular central shaft, whilst the mounting unit itself and the fluid feed pipe are typically non-rotating. The clearance between end of the tubular central shaft and the bearings within the annular recess is such as to allow the tubular shaft to rotate freely whilst preventing fluid from the fluid feed pipe and interior of the tubular central shaft from leaking out between the end of the shaft and the bearings. Thus the end of the shaft and the boundaries (e.g. as defined by walls or bearings) together define a narrow labyrinthine path from the interior of the tubular central shaft to the exterior of the apparatus along which fluid would need to pass in order to leak to the exterior. The configuration of the labyrinthine path is such that that a labyrinth seal is created which prevents the leakage of fluid exterior. In order to provide further security against leakage, one or more air inlets may be for drawing or pumping air into the labyrinthine path. When air is pumped into the air inlets or drawn into the air inlets, the end of the central tubular shaft outlet is suspended within the annular recess, such that the bearings do not need to support its full weight. This allows rotation of the central tubular shaft outlet with less friction. In addition, pressure of air entering the labyrinth seal through the air inlets further prevents fluid from leaking out of the labyrinth seal. The labyrinth seal can of course be reversed so that the fluid inlet and fluid outlets are connected in the opposite manner.

The separator is provided with first and second outlets through which separated components of the fluid stream can pass. Thus, a first component of the fluid stream, or a mixture predominantly comprising a first component of the fluid stream can pass out through one outlet and a second component of the fluid stream, or a mixture predominantly comprising a second component of the fluid stream can pass out through the other outlet. In one embodiment, the first outlet takes the form of one or more openings on a radially outer surface of the separator unit (e.g. one or more openings in the hollow, cylindrical portion). The outlets may have walls that are at an angle of 30-45° with respect to the rotational axis in order to reduce turbulence and hence improve separation efficiency as the separated higher density components pass out through the outlet.

The second outlet may take the form of an end of the tubular central shaft, where present. Alternatively, the first outlet may encircle the second outlet, with a dividing wall (e.g. a cylindrical dividing wall) separating the two outlets.

Each of the first and second outlets are connected or connectable to the first and second collectors respectively. In one embodiment, the apparatus comprises a first collector which is connected to the first outlet. In another embodiment, the apparatus comprises a second collector which is connected to the second outlet. In a further embodiment, the apparatus comprises first and second collectors which are connected to the first and second outlets respectively.

The or each collector is typically static, i.e. it is non-rotatably attached to the support structure and does not rotate with the separator.

A first collector associated with the first outlet may comprise a circumferential channel-shaped manifold surrounding the centrifugal separator unit with an open side of the channel facing radially inwardly towards the separator unit so as to receive separated fluid components emerging from each first outlet. The channel shaped manifold is provided with one or more openings with associated conduits through which separated fluid components may be directed to a storage vessel or to waste.

As the channel-shaped manifold is fixed while the centrifugal separator unit rotates, there is a small gap between the edges of the channel and an outer surface of the separator to allow rotation to take place. A moving seal may be provided between the channel shaped manifold and the separator unit to prevent escape of separated fluid components through the gap. Alternatively, the seal may take the form of a fan or labyrinth seal.

Preferably, the separator is constructed to provide a pressure differential between the interior of the manifold and the exterior so that air passes into the manifold and the passage of separated fluid components out through the gap is prevented.

The separator can be constructed so that the pressure differential is created by drawing air through the gap into the manifold. Alternatively, the separator can be constructed so that air (or another gas or mixture of gases) is introduced under pressure through the gap into the manifold.

In one embodiment, the outer surface of the separator unit is provided with an array of vanes around its circumference and disposed within the channel that are arranged so that air is drawn into the channel through the gap as the separator unit rotates. The vanes thus form a fan seal which prevents leakage of materials through the gap between the collector device and separator unit. The fan seal may have a variable diameter to enable the gap between the separator unit and seal to be adjusted when required or necessary.

When the centrifugal separator unit has an array of vanes around its circumference, a plurality of openings constituting the first outlets may be provided between adjacent vanes or groups of vanes. For example, each pair of vanes may have disposed between them an opening constituting a first outlet. Alternatively, openings constituting first outlets may be located every two, three or four vanes around the circumference of the separator unit.

In one particular embodiment, one or both of the collectors are disposed radially outwardly of the separator and are associated with the centrifugal separation chamber.

The apparatus is provided with a drive element for rotating the separator unit. The drive element may comprise a motor (e.g. an electric motor) or a turbine (e.g. a high-pressure air turbine or a hydraulic turbine) and an appropriate mechanical linkage between the motor or turbine and the separator unit. The mechanical linkage can be, for example, a drive belt. The use of an air turbine or hydraulic turbine is advantageous in environments where it is important to avoid the hazards of electrical spark ignition of explosive gas mixtures (e.g. on oil platforms and similar locations).

The inlet is preferably connected or connectable to a source of pressurised fluid requiring separation. When the source of fluid is pressurised, instead of, or in addition to, a motor or turbine, the fluid stream itself can be used to drive or assist rotation of the separator. For example, the separator may be provided with an array of vanes or nozzles and means for directing the fluid stream or a fluid output from the separator over the vanes or through the nozzles to form a turbine which drives rotation of the separator.

In one embodiment, a fluid output from which suspended matter has been removed by the separator is used to power the turbine.

The vanes may be disposed within a collector device so that purified or partially purified fluid passing through the collector is used to power the turbine.

In an alternative embodiment, the flow of fluid through the separator can be split so that a proportion is used to power the turbine and the remainder is collected by a collector.

The flow of fluid into and through the apparatus is typically controlled by a pump. It has been found that by using a pump that is capable of providing a substantially constant flow rate of fluid into the apparatus, the separation efficiency of the apparatus is greatly enhanced. One such pump is a wobble pump.

All surfaces of the apparatus that are exposed to the fluid (including the separator unit, the inner wall, the diverter and the wall member) are preferably made from a smooth and corrosion resistant material, one example of which is stainless steel. Additionally, the surfaces may be polished to minimise turbulence and promote more laminar flow of the fluid through the apparatus.

The separator apparatus described herein is typically configured to enable it to carry out a particular type of separation.

In one embodiment, the separator can be configured to separate a mixture of two fluids, wherein the first fluid has a greater density than the second fluid. For example, the separator can be configured to separate oil and water in an oil-water mixture.

The first collector may be arranged to collect separated fluid from the centrifugal separation chamber, via the first outlet. In this embodiment, vanes may be arranged within the collector so as to form a turbine powered by the separated fluid.

The apparatus may also comprise a device for determining the extent of separation. Once the extent of separation of the apparatus has been determined, the apparatus can then be adjusted accordingly to increase the extent of separation.

In one embodiment, the device for determining the extent of separation comprises one or more light sources and one or more light detectors. The separated fluids and/or materials are then passed between one of the light sources and one of the light detectors. The purity of the separated components can then be determined by comparing the absorbance of the fluid components from the first and second outlets, with known absorbance values for pure samples or defined mixtures of the separated components.

In another aspect, the invention provides a centrifugal separator apparatus for separating components of a fluid stream;

the apparatus comprising a support structure and a centrifugal separator unit rotatably mounted on the support structure so as to be rotatable about a rotational axis extending through the centrifugal separator unit;

a drive element for driving rotation of the centrifugal separator unit;

the centrifugal separator unit comprising a hollow body mounted on a central shaft which is rotatable about the rotational axis;

wherein the hollow body comprises a pair of radially spaced apart walls bounding an annular centrifugal separation chamber therebetween; the annular centrifugal separation chamber having an upstream frustoconical region, a downstream frustoconical region and a substantially cylindrical middle region between the upstream and downstream frustoconical regions;

an inlet which is connected or connectable to a source of fluid requiring separation and through which fluid to be separated can be introduced into the upstream frustoconical region;

an axially movable divider blade disposed in the downstream frustoconical region, the divider blade being configured to divide the fluid stream into a radially outer stream containing a higher density component of the fluid stream, and a radially inner stream containing a lower density component of the fluid stream;

a first collector to which the radially outer stream is directed; and a second collector to which the radially inner stream is directed.

The support structure, drive element, divider blade, and first and second collectors may be as defined above for the first aspect of the invention.

Preferably the radially spaced apart walls are spaced apart in a manner such that the cross-sectional area of the annular centrifugal separation chamber is substantially constant along its length of the channel. This further assists in reducing turbulence and thereby facilitates more laminar flow of the fluid through the chamber.

In a further aspect, the invention provides a centrifugal separator apparatus for separating components of a fluid stream;

the apparatus comprising a support structure and a centrifugal separator unit rotatably mounted on the support structure so as to be rotatable about a rotational axis extending through the centrifugal separator unit;

a drive element for driving rotation of the centrifugal separator unit;

wherein the centrifugal separator unit comprises a centrifugal separation chamber having an inlet which is connected or connectable to a source of fluid requiring separation, a first outlet for collecting a higher density component of the fluid stream, and a second outlet for collecting a lower density component of the fluid stream;

the first outlet being connected or connectable to a first collector for collecting the higher density component and the second outlet being connected or connectable to a second collector for collecting the lower density component;

the centrifugal separation chamber optionally comprising a curved or inclined guide surface for guiding flow of the fluid from the inlet in a radially outward direction;

and the centrifugal separator unit optionally being provided with a wall member which is axially movable to provide a selected degree of occlusion of the first outlet and thereby control flow of the higher density component through the first outlet;

wherein the first and/or the second outlets are in fluid communication with one or more devices for determining the extent of separation of the components of the fluid.

The device for determining the extent of separation may comprise one or more light sources and one or more light detectors as defined above.

In a further aspect, the invention provides a method of separating components of a fluid stream, which method comprises passing the fluid stream through an apparatus as defined herein.

In one particular embodiment, the apparatus of the invention is set up to purify water. The pressurised source of liquid is therefore a pressurised source of water. The water can be, for example, water taken from a bore hole, well, river, stream, pond, lake or body of salt water, or from a waste water container, and the pressure is supplied by means of a pump which is used to pump the water to and through the apparatus. In this embodiment, the water pressure created by the pump may be used to provide a primary or ancillary means of power for rotating the separation unit. Where the water pressure is used as the primary means of power for rotating the separation unit, a motor or turbine may be used as an ancillary power source to increase the speed of rotation where the water pressure alone is insufficient to rotate the separation unit at the desired speed. A motor may also be used to initiate rotation of the separation unit in order to create an initial centrifugal force to separate out particulate matter. Once the centrifugal force has reached a level sufficient, the motor may then be turned off.

In another embodiment, the apparatus of the invention is set up to remove particulate matter suspended in a fluid. The particulate matter may comprise, for example, sand, soil, clay or grit particles. Such particulate matter is typically denser than water and hence passes out through the first outlet whereas water from which the particulate matter has been removed passes out though the second outlet.

Examples of fluids in which particulate matter is suspended include liquid slurries or suspensions arising from drilling and fracking operations.

The pump and any ancillary motors may be powered by mains electricity, or by means of a portable generator, or by any of a range of renewable energy sources such as solar power.

The apparatus of the invention may also be used to filter other liquids such as hydrocarbons.

In one particular embodiment, the method is used to separate oil and water. This embodiment of the invention is envisaged as being particularly useful in cleaning up operations following an oil spill. Thus, for example, the apparatus can be mounted on a boat or other floating support and sea water pumped through the apparatus. Oil removed from the seawater can be stored in a container for disposal or recycling and the water returned to the sea, or passed through one or more further filters or separation devices to remove any remaining traces of oil.

The apparatus of the invention can be constructed so as to be portable, for example on a truck or lorry, and can therefore be transported quickly and easily to locations where it is needed, for example in disaster relief operations where there is a shortage or absence of clean water.

The apparatus of the invention as described above provides excellent separation of multiphase fluid streams. However, in certain circumstances fluids separated by passage through the apparatus may retain very low levels of impurities. For example, when the fluid stream comprises water and entrained particulate materials (e.g. sand or grit), the components passing out of the second outlet may comprise small amounts of sand or grit together with the water (and vice versa). When the fluid comprises a water/oil mixture, the components passing out through the first outlet may consist predominantly of water and any dissolved substances and, depending on the extent of separation, some oil (and vice versa).

Such low levels of contaminants may impart slight turbidity to the water but are typically not visible or are difficult to see using the naked eye.

In order to reduce further (or eliminate) the levels of residual contaminants in the separated fluid stream, the first or second outlets of the apparatus may be connected to a further separation device.

The further separation device may be a vortex separation device. The vortex separation device comprises a vortex-creating device which imparts a vortex to the fluid stream and a separator unit in which separation of the vortexed fluid stream occurs. At the downstream end of the separator unit, there may be two concentric outlets; an annular, radially outer outlet for collecting a denser component of the fluid stream and a radially inner outlet for collecting a less dense component of the fluid stream.

In contrast to the apparatus described herein where the centrifugal separator unit (in which separation occurs) rotates to provide the centrifugal force necessary for separation, in a vortex separation device the separator unit does not rotate. Instead, as the fluid to be separated enters the separator unit, the fluid is rotated/spun to form a vortex. In this case, the rotational movement of the fluid in a vortex creates the centrifugal forces required for separation.

The vortex separation device therefore comprises a vortex-creating device for imparting a vortex to the fluid stream. The term 'vortex', as used herein, refers to the rotation or revolution of a fluid around an axis (typically a linear axis). The vortex-creating device may therefore be any device that is able to impart such rotation or revolution to the fluid stream.

The vortex-creating device may comprise one or more vortex-creating elements for example, spiral/screw-shaped nozzles, angled nozzles, angled vanes or angled channels. As the fluid stream passes through the vortex-creating device the vortex-creating elements direct the fluid along a circular or spiral path to impart a vortex to the fluid stream.

The vortex-creating elements are typically arranged (preferably equidistantly arranged) about a central axis around which the fluid is to be rotated. The vortex-creating elements typically comprise one or more openings or one or more baffles that are angled relative to the central axis such that a vortex is induced in the fluid as it passes through the openings or past the baffles.

The vortex-creating device is typically the only path through which the fluid stream can enter the separation unit. Therefore, the flow of all fluid entering the separation unit passes through the vortex-creating device and is hence affected/modified by the vortex-creating elements.

Examples of vortex-creating devices having baffles as vortex-creating elements include deflector plates, spiral/screw-shaped nozzles and angled vanes. The baffles may be angled relative to the central axis such that a vortex is induced in the fluid as it passes through the nozzles. For example, the baffles may be angled by 40° to 50°, for example 45°, relative to the central axis.

In the case of spiral/screw-shaped nozzles, the nozzles typically comprise a conical funnel having an opening at its apex. Fluid flows through the conical funnel and out through the apex. Downstream of the apex but fixed to the outer surface of the nozzle is a spiral/screw-shaped baffle defining a spiral/screw-shaped path. Therefore, fluid exiting the nozzle apex opening encounters the spiral/screw-shaped baffle and is forced along the spiral/screw-shaped path, which imparts rotation to the fluid stream.

Examples of vortex-creating devices having angled openings include angled nozzles or plates with angled channels.

When the vortex-creating elements are angled nozzles, the nozzles are arranged (preferably equidistantly) about a central axis around which the fluid is to be rotated. The nozzles are angled relative to the central axis such that a vortex is induced in the fluid as it passes through the nozzles. For example, the nozzles may be angled by 40°-50°, for example 45°, relative to the central axis.

When the vortex-creating element is a plate with angled channels, the channels are typically arranged equidistantly about a central axis around which the fluid is to be rotated. The plate is typically cylindrical in shape, with the channels passing through the full thickness of the plate. The channels are angled relative to the central axis such that a vortex is induced in the fluid as it passes through the nozzles. For example, the channels may be angled by 40° to 50°, for example 45°, relative to the central axis. The channels may be the only path through which the fluid stream can enter and exit the vortex-creating device and therefore may be the only path through with the fluid stream can enter the separator unit.

The vortex separation device may also comprise, in addition to the vortex-creating device, an impeller. The impeller serves to increase the rotational velocity of the fluid in the separator unit to enhance separation. This is particularly desirable if the components in the fluid stream to be separated have similar densities (e.g. water/oil). In this case, the use of an impeller increases the rotational velocity of the fluid stream and thereby increases the centrifugal forces acting on the components of the fluid stream to increase separation efficiency.

Alternatively or in addition, the impeller itself may be constructed so as to introduce a vortex to the fluid stream. In this embodiment, the impeller acts as the vortex-creating device.

The impeller is typically connected to a drive element for rotating the impeller. The drive element may comprise a motor (e.g. an electric motor) or a turbine (e.g. a high-pressure air turbine or a hydraulic turbine) and an appropriate mechanical linkage between the motor or turbine and the separator unit. The mechanical linkage can be, for example, a drive belt. The use of an air turbine or hydraulic turbine is advantageous in environments where it is important to avoid the hazards of electrical spark ignition of explosive gas mixtures (e.g. on oil platforms and similar locations).

Prior to the fluid stream passing through the vortex-creating device, the fluid stream may be channelled to reduce turbulence. Reduced turbulence in the fluid stream entering the vortex-creating device results in a greater separation efficiency.

The vortex separation device may therefore comprise an inlet flow chamber containing a plurality of walls that define a plurality of channels for channelling the fluid stream. The channels may be parallel or may converge towards the downstream end of the vortex separation device. For example, the channels may converge together at an angle of up to 20° or up to 10°.

The vortex separation device may comprise six or more, seven or more or eight or more walls that define the channels. In one embodiment, the vortex separation device comprises eight walls that define the channels. The walls that define the channels may be formed from a metal or plastics material, which is sufficiently rigid so as not to deform as the fluid stream passes through the device.

The walls are typically longitudinally extending in the direction of the fluid stream through the inlet flow chamber. The walls may also extend towards the centre of the inlet flow chamber (but not necessarily extend radially towards the centre of the inlet flow chamber).

In one embodiment, a channel may be an open-sided channel and may be formed from a base portion and a pair of side walls extending therefrom to form an open-sided channel. In a further embodiment, a channel may be a closed channel and may comprise a base portion and a pair of side walls extending therefrom, the side walls being linked together to form a single continuous wall which defines a closed channel. The walls may be straight, curved or bent. When the walls define an open-sided channel, the walls may converge (either converging at the same extent or to different extents). The open side of the channel typically faces towards the centre of the inlet flow chamber.

The walls or bases are typically fixed to an interior wall of an inlet to the separation unit. Typically, the fixings used to fix the walls/bases to the interior wall of the inlet to the separation unit are chosen to minimise turbulence as the fluid stream passes over the fixings (e.g. use of countersunk screws or rivets). Alternatively, the walls may be integrally formed with the inlet flow chamber.

For example, in one embodiment, the vortex separation device may comprise an inlet flow chamber containing three, four or five (e.g. four) open-sided channels, each channel being defined by a base portion and a pair of (typically convergent) side walls extending from the base portion, wherein the open-sided channels face towards the centre of the inlet flow chamber and the base portions are each fixed to an interior wall of the inlet flow chamber.

In another embodiment, the vortex separation device may comprise an inlet flow chamber containing three, four or five (e.g. four) open-sided channels, each channel being defined by a base portion and a pair of (typically convergent) side walls extending from the base portion, wherein the open-sided channels face towards the centre of the inlet flow chamber and the base portions are each integrally formed with, or form part of, an interior wall of the inlet flow chamber.

The guide walls are typically located upstream of the vortex-creating device and impeller (if present).

The downstream ends of the guide walls may be angled and act as baffles (as described above) integrally formed with the channel-defining guide walls. The ends of the guide walls may be bent at an angle of 40° to 50°, for example 45°, with respect to the upstream end of the guide walls. The guide walls therefore serve to initially reduce turbulence in the fluid stream and then as a vortex-inducing element to introduce a vortex to the fluid stream so that separation of the fluid stream can occur in the separation unit.

Downstream of the vortex-creating device, the vortex separation device also comprises a separator unit, which is typically tubular in shape. As the fluid to be separated passes through the separator unit, the higher density components of the fluid move outwardly towards the periphery of the separator unit to a greater extent than the lower density components thereby resulting in separation of the higher and lower density components.

The vortex separation device has an inlet which is connected or connectable to a source of fluid requiring separation. There may be only one such inlet, or there may be present a plurality of openings into the device, each of which constitutes an inlet. As described above, the vortex separation device may be connected downstream of a centrifugal separator apparatus described herein. Hence, the first or second outlets of a centrifugal separator apparatus described herein may be connected to the inlet of the vortex separation device.

The inlet is preferably connected or connectable to a source of pressurised fluid requiring separation. When the source of fluid is pressurised, instead of, or in addition to, a motor or turbine, the fluid stream itself can be used to drive or assist rotation of the separator. For example, the separation unit may be provided with an array of vanes or nozzles and means for directing the fluid stream or a fluid output from the separation unit over the vanes or through the nozzles to form a turbine which drives rotation of the impeller.

In an alternative embodiment, the flow of fluid through the separator can be split so that a proportion is used to power the turbine and the remainder is collected by a collector.

The separator unit is provided with first and second outlets through which separated components of the fluid stream can pass. Thus, a first component of the fluid stream, or a mixture predominantly comprising a first component of the fluid stream can pass out through one outlet and a second component of the fluid stream, or a mixture predominantly comprising a second component of the fluid stream can pass out through the other outlet.

The first and second outlets are typically coaxially aligned with the first outlet taking the form of an annular outlet surrounding the second outlet.

The second outlet may take the form of an end of the tubular central shaft, where present. The first outlet may encircle the second outlet, with a dividing wall (e.g. a cylindrical dividing wall) separating the two outlets. Alternatively, the first outlet takes the form of one or more openings on a radially outer surface of the separator unit (e.g. one or more openings in the hollow, cylindrical portion).

Each of the first and second outlets are connected or connectable to the first and second collectors respectively. In one embodiment, the apparatus comprises a first collector which is connected to the first outlet. In another embodiment, the apparatus comprises a second collector which is connected to the second outlet. In a further embodiment, the apparatus comprises first and second collectors which are connected to the first and second outlets respectively.

The separation unit may be made from metals, plastics or other durable materials or combinations thereof. In one embodiment, the separation unit is made from an acrylic plastic. In another embodiment, the separation unit is made from stainless steel.

The vortex separation device described herein is typically configured to enable it to carry out a particular type of separation.

In one embodiment, the separation device can be configured to separate a mixture of two fluids, wherein the first fluid has a greater density than the second fluid. For example, the separator can be configured to separate oil and water in an oil-water mixture. Alternatively, the separation device can be configured to separate solid matter from a liquid. The solid matter typically has a density that is of greater value than the liquid. For example, the separator can be configured to separate sand from water.

It will be appreciated that the extent of separation of the components of the fluid stream will typically depend on the geometry of the separation unit and speed of rotation of the impeller. Thus, for a fluid comprising a water/oil mixture, the speed of rotation of the centrifugal separator unit may be selected so that substantially oil-free water passes out of the first outlet or substantially water-free oil passes out through the second outlet. A fluid stream with components of a more similar density will require a larger separation unit (e.g. a tubular separation unit with a larger diameter) and/or a higher impeller rotation speed.

The invention also provides a vortex separation device as described herein per se (i.e. not necessarily in combination with the centrifugal separation device described herein).

In particular, the invention provides a vortex separation device for separating components of a fluid stream comprising:

- a separator unit in which separation of the fluid occurs;
- a fluid inlet for introducing a pressurised source of the fluid to be separated into the separator unit;
- one or more channels for reducing turbulence in the fluid stream; and
- a vortex-creating device for introducing a vortex to the fluid stream.

The vortex separation device may be further characterised as described above and the examples and embodiment described above in relation to the vortex separation device in combination with the centrifugal separation device apply equally to the vortex separation device alone.

The vortex separation devices described herein may be used in isolation or in combination with other separation devices.

In another aspect, the invention provides an upstream first separation apparatus; a downstream vortex separation device as described herein; and a conduit for connecting an outlet of the first separation apparatus to an inlet of the vortex separation device.

The first separation apparatus may be a centrifugal separation apparatus as described herein. Accordingly, in one embodiment, the invention provides an apparatus comprising an upstream centrifugal separation apparatus as defined and described herein; a downstream vortex separation device as described herein; and a conduit for connecting an outlet of the centrifugal separation apparatus to an inlet of the vortex separation device.

In a further embodiment, the apparatus may comprise a centrifugal separation device as defined and described herein in combination with a pair of downstream vortex separation devices, one vortex separation device being connected to a first outlet of the centrifugal separation device and one vortex separation device being connected to a second outlet of the vortex separation device.

In another embodiment of the invention, there is provided a vortex separation device for separating components of a fluid stream (e.g. separating a mixture of oil and water), the device comprising:

- a separator unit in which separation of the fluid occurs;
- a fluid inlet for introducing a pressurised source of the fluid to be separated into the separator unit;
- one or more channels for reducing turbulence in the fluid stream;
- a plate with angled channels, the channels being arranged equidistantly about a central axis around which the fluid is to be rotated, for introducing a vortex to the fluid stream; and
- an impeller for increasing the rotational velocity of the vortexed fluid stream.

In a further embodiment, there is provided a vortex separation device for separating components of a fluid stream (e.g. separating a mixture of sand and water), the device comprising:

- a separator unit in which separation of the fluid occurs;
- a fluid inlet for introducing a pressurised source of the fluid to be separated into the separator unit;
- one or more channels for reducing turbulence in the fluid stream; and
- a plate with angled channels, the channels being arranged equidistantly about a central axis around which the fluid is to be rotated, for introducing a vortex to the fluid stream.

In yet a further embodiment, there is provided a vortex separation device for separating components of a fluid stream (e.g. separating a mixture of sand and water), the device comprising:

- a separator unit in which separation of the fluid occurs;
- a fluid inlet for introducing a pressurised source of the fluid to be separated into the separator unit; and
- one or more guide walls defining channels for reducing turbulence in the fluid stream; wherein downstream ends of the guide walls are angled so as to introduce a vortex to the fluid stream.

The vortex separation devices described in these embodiments may be further characterised as described above. The examples and embodiment described above apply equally to the vortex separation devices of these embodiments. The invention will now be illustrated in more detail (but not limited) by reference to the specific embodiment shown in the accompanying drawings, which is an apparatus for the purification of water.

DETAILED DESCRIPTION OF THE INVENTION

Figure 1:
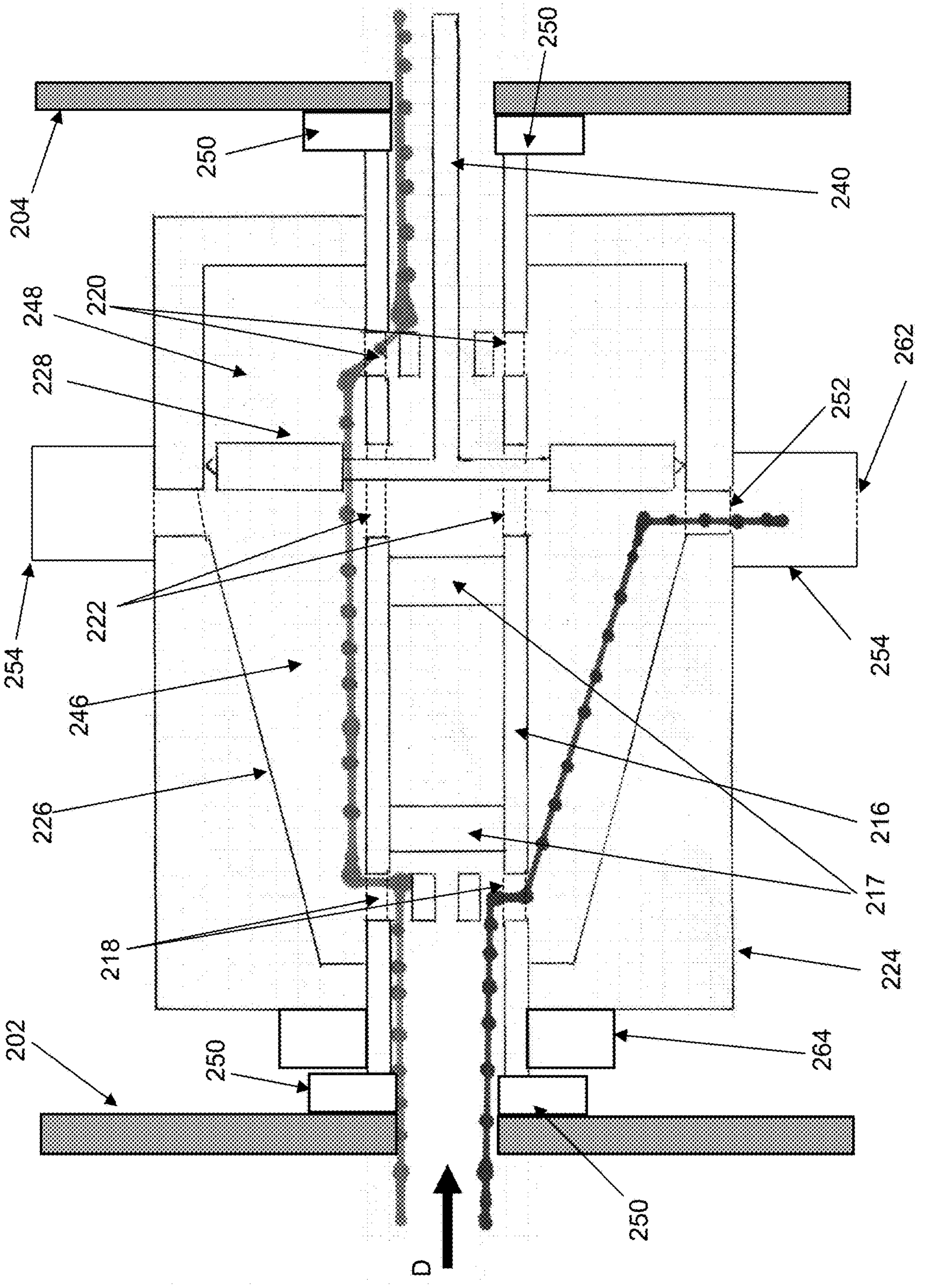
FIG. 1 shows a cross-sectional view of an apparatus according to the first embodiment of the invention.
Figure 2:
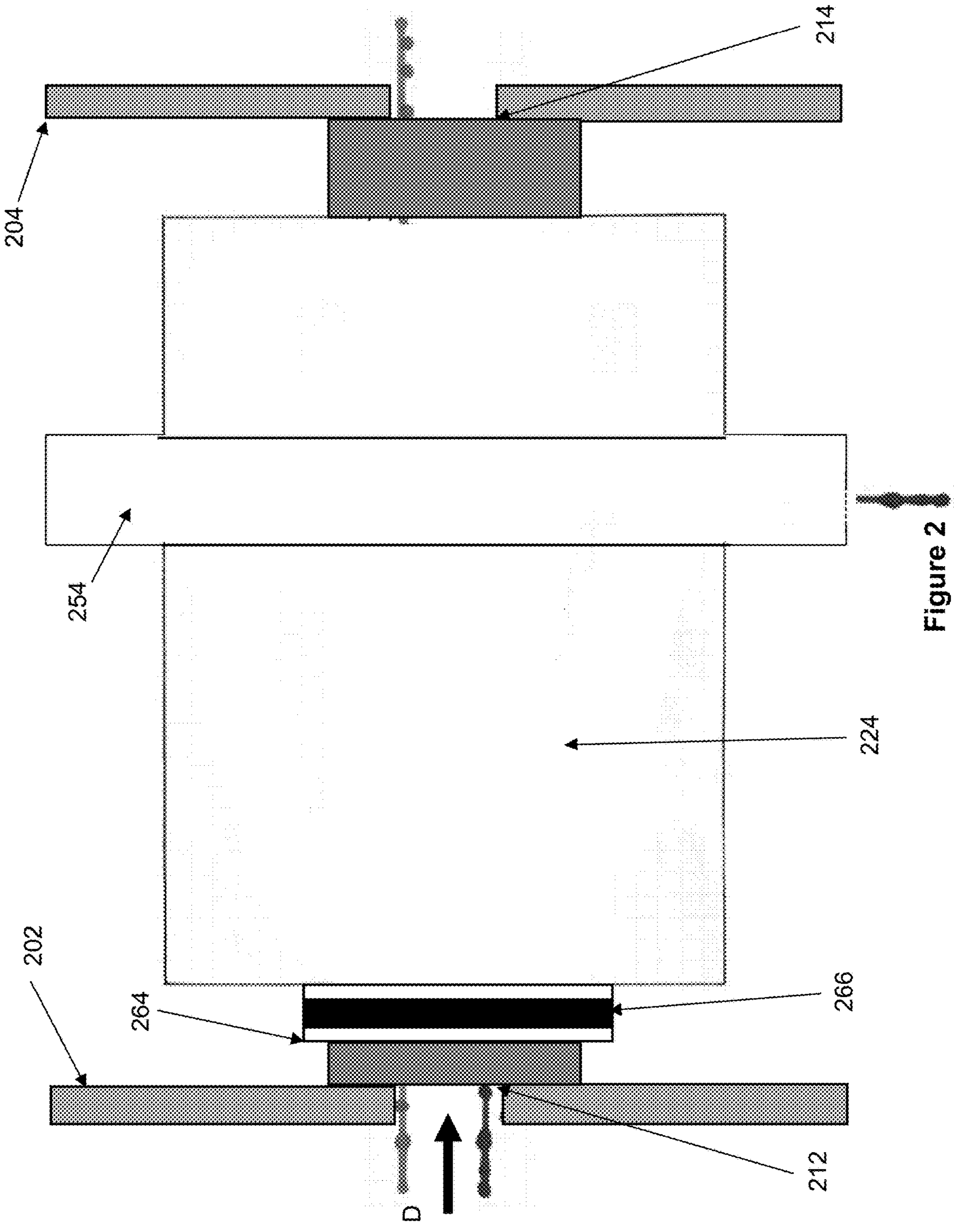
FIG. 2 shows an external view of the apparatus shown in FIG. 1.

An apparatus according to a first embodiment of the invention is illustrated in FIGS. 1 to 4. As shown in FIGS. 1 and 2, the apparatus includes a support structure comprising a pair of end walls 202, 204 connected together by a plurality of (for example, eight) threaded rods (not shown) which are secured to the end walls 202, 204 by means of nuts either side of each wall.

Mounted on the inwardly facing sides of the two end walls 202, 204 are bearing assemblies 250. The two ends of a tubular shaft 216 (referred to below as tube 216) extend into the bearing assemblies and are rotatably mounted therein. The bearing assemblies typically comprise a cylindrical casing containing a plurality of bearings surrounding the ends of the tube 216 and in which the ends of the tube can rotate. The bearings can be of conventional type and thus, for example, can be taper bearings, roller bearings, needle bearings or an array of ball bearings.

Figure 3:
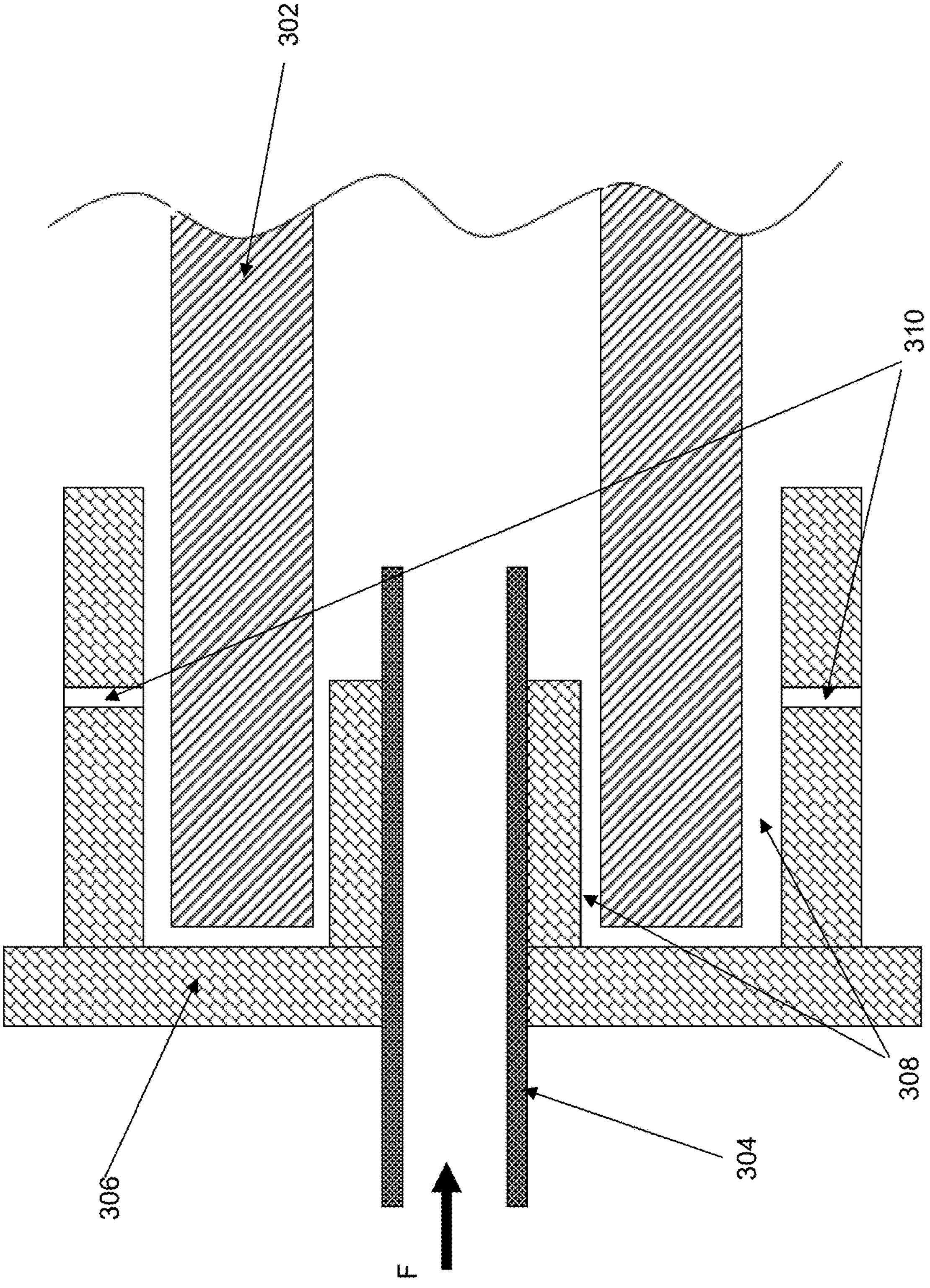
FIG. 3 shows a cross-sectional view of a labyrinth seal used to connect a fluid feed pipe or an outlet pipe to the apparatus according to the first embodiment of the invention.

One or both bearing assemblies (and more usually the bearing assembly 202) can be constructed so as to form a labyrinth seal as shown in FIG. 3.

Mounted on tube 216 is a cylindrical drum 224. The drum 224 is fixed to the tube 216 such that the drum rotates with the tube 216. The drum can be formed from a suitably tough plastics material or a corrosion resistant metal such as stainless steel, or a combination of plastics and metallic materials and, viewed from the exterior, is of generally cylindrical form.

Tube 216 has two ends—a fluid supply end 212 and an outlet end 214. At the fluid supply pipe end of the drum, the drum has a conical inner surface 226. The conical inner surface 226 is shaped such that fluid entering the drum is diverted to the outermost regions of the drum where the centrifugal forces are the greatest. The conical inner surface provides this diversion without imparting substantial turbulence on the fluid stream. The conical inner surface may be an inner surface of the cylinder (in this case, whilst the outer wall of the cylinder is of constant width, the inside of the cylinder does not have a constant diameter). Alternatively, the conical inner surface may be a surface of a separate component which is placed within the cylinder to provide the same internal shape as described above. Where the conical inner surface is a surface of a separate component, the component may be formed from a material which is the same as or different from the material from which the drum is formed. For example, a separate component providing the conical inner surface may be formed from a corrosion resistant metal such as stainless steel or from a suitable tough plastics or composite material.

The outer surfaces of the fluid supply pipe and the outlet pipe(s) can be sealed against the inner surfaces of the two ends of the tube 216 and optionally against the inner surface of collector outlet 262 by means of labyrinth seals, as shown in FIG. 3.

The labyrinth seals 306 have an inlet for receiving fluid feed pipe 304 and a circular recess for receiving an end of tubular shaft 302 (equivalent to tube 216 in FIG. 1) of a drum 224 which is in fluid communication with the first chamber in the drum. Fluid enters the seal through fluid feed pipe 304 in direction F as shown in FIG. 3. Whilst the fluid feed pipe 304 and labyrinth seal 306 do not rotate when the apparatus is in use, bearings within the labyrinth seal (not shown) allow the end of the tubular shaft 302 to rotate inside the labyrinth seal. The labyrinth seal contains tortuous paths 308 (typically less than 1 mm in width) which prevent leakage of the fluid from the seal. The use of labyrinth seals means that if the air feed pressure is greater than the fluid pressure being processed, then the fluid cannot push past the labyrinth seal and leak out. The labyrinth seal therefore provides a means for connecting a static, non-rotating fluid feed pipe to the rotating tubular shaft and drum, whilst preventing leaking of the fluid. The labyrinth seals can similarly be used to connect outlet pipes to the drum.

The labyrinth seals 306 also comprise air inlets 310 which are in fluid communication with centre of the seal by means of the paths 308. Air can be drawn into the labyrinth seal through the air inlets, either as a result of the pressure of the fluid passing through the seal, or by using an external pressured air source to inject pressured air into air inlet 310. When the air pressure inside the labyrinth seal is sufficient, the drum shaft 302 will be suspended, taking the weight of the drum off the bearings in the seal. This means that the labyrinth seal is virtually friction free and therefore lasts longer compared to conventional seals, which easily degrade when the input fluid contains particulate matter, such as sand and/or grit.

The tube 216 has two circumferential arrays of elongate, angled slots 218, 220 and a plurality (in this embodiment three) of elongate longitudinal slots 222 located around the circumference of the tube. The function of the holes and slots is described below.

The pipe bore is blocked by blocking elements 217 in the form of discs each having an annular sealing element set into its outer edge to form a seal against the inner wall of the pipe. The blocking elements or blanks prevent fluid from passing along the pipe bore.

The interior of the drum is partitioned into a first chamber 246 and a second chamber 248 by disc assembly 228. Holes in disc assembly 228 provide fluid communication between the first and second chambers.

Figure 4:
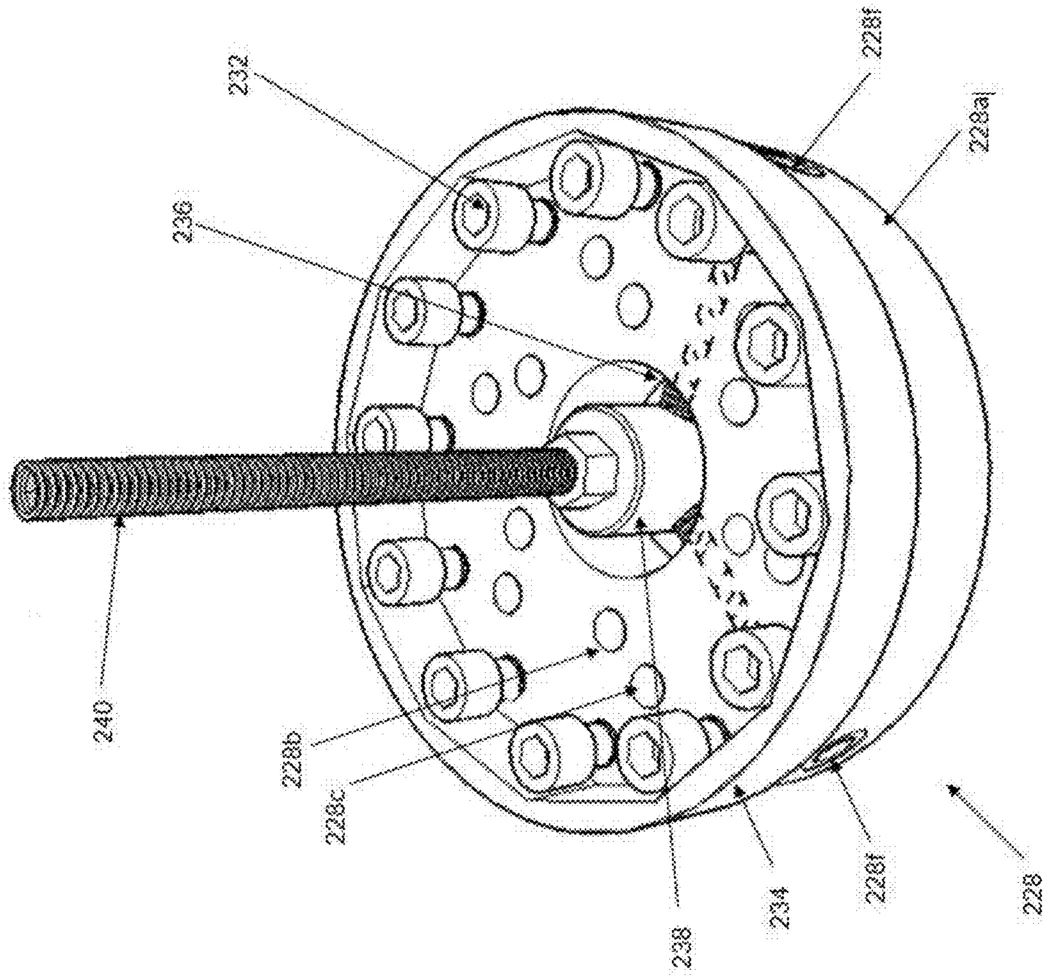
FIG. 4 shows the disc assembly, which acts as the wall member in the apparatus according to the first embodiment of the invention.

The intermediate disc assembly 228, shown in more detail in FIG. 4, comprises a disc 228*a* of a transparent plastics material, although it could instead be formed from a non-transparent plastics material or a corrosion resistant metal such as stainless steel. The disc 228*a* has three circumferential arrays of holes. Seated in the outermost holes are bolts 232. Bolts 232 serve to hold in place an annular sealing element 234 which is stretched around the bolts. The annular sealing element 234 of the intermediate disc assembly 228 sits tightly against the inner surface of the drum. The sealing element 234 is formed from a suitable elastomeric sealing material. Radially inwardly of the holes for bolts 232 is a circumferential array of six holes 228*c* through which the threaded rods (not shown) pass, which secure disc assembly 228 to the drum. Radially inwardly of holes 228*c* are the holes 228*b* of which, in this embodiment, there are six. Holes 228*b* allow fluid communication through the disc 228*a*.

In addition to the central hole 228*e* and three circumferential arrays of holes 228*b*, 228*c* and 228*d*, the disc 228*a* has three passages 228*f* extending from the radially outer edge of the disc to the central hole 228*e*. Located within the three passages 228*f* are three fastening bolts 236. The inner ends of fastening bolts 236 extend through the slots 222 in the tube 216 and are anchored in a cylindrical sealing plug 238. The sealing plug 238 is attached to a threaded actuator rod 240 which extends along the interior of the tube and out through a sealing gland associated with the pipe 214. The end of the threaded actuator rod can be received in a rotatable actuator device, the rotation of which gives rise to longitudinal (axial) movement of the actuator rod and hence longitudinal movement of the sealing plug 238 along the tube. Thus, the actuator rod 240 can be used to move the sealing plug and, because the disc 228 is attached to the sealing plug 238, movement of the sealing plug will also result in axial movement of the disc 228. Movement of the sealing plug 238 and disc 228 enables the effective size of the opening defined by the slots 252 to be varied, for example by increasing the opening size to facilitate the passage therethrough of more viscous materials or larger particulates.

By changing the size of the slots 252, the separated fluid stream can be split at different points, to allow one separated material to pass through slot 252 and the other to continue to pass through the drum towards the outlet pipe 214.

Attached to the outer surface of the drum is an array of vanes (not shown). In this embodiment, the vanes are longitudinally oriented but they could instead be oriented at an angle, for example, of up to 45° (e.g. from about 15° up to 40°, or from about 20° up to 37°, or from about 25° up to 35°, or from about 30° to about 32°) with respect to the rotational axis of the tube 216. In one embodiment, the vanes are formed in pairs, each pair being constituted by two sides of a strip of metal of channel section. The third (i.e. intermediate) side of the channel section strip is attached to the drum cylinder by means of rivets or other fastening elements. Between each vane, slots 252 are positioned to provide an opening into the interior of the drum.

A static collector device 254 encircles the rotating drum but does not rotate with it. The collector device 254 comprises an annular channel-shaped structure, the open face of the channel shaped structure facing inwardly towards the rotating drum. The channel shaped structure has an interior circumferential channel enclosing the vanes on the outer surface of the rotating drum. There is a small clearance between the inner edges of the channel-shaped structure and the outer surface of the rotating drum.

The collector device 254 does not rotate with the rotating drum but is fixed to the support structure 202, 204. The vanes on the outer surface of the drum form a fan seal which reduces the air pressure within the circumferential channel and hence draws air through the gap between the outer surface of the drum and the collector device. This serves to prevent leakage of materials through the gap between the collector device and drum. Means (not shown) may be provided for adjusting the gap between the outer surface of the drum and the collector device should this be considered necessary or desirable to assist the prevention of leakage between the drum and the collector device.

At its lower end (the term "lower" referring to its orientation in use), the channel-shaped structure has a circular or oval opening 262 which defines an outlet for the collector. The opening 262 is connected to a tube for carrying away materials passing through the opening.

The rotation of the rotating drum is driven by a drive belt 266 which engages with a drive wheel 264. The drive belt is linked to a hydraulic powered turbine, a high-pressure air powered turbine or a motor (not shown).

In one particular embodiment, the apparatus can be used to separate an oil-water sludge into a predominantly water-containing component and a predominantly oil-containing component.

Thus, an oil-water sludge is pumped through an inlet pipe (see FIG. 3) in direction D and thence into the tube 216 which under the influence of the drive belt 266. The passage of oil-water sludge along the interior of the tube is blocked by blocking element 217 and therefore it passes into the centrifugal chamber 246 through the slots 218 in the wall of the tube. The movement of the sludge into the chamber is assisted by the centrifugal force imparted by the rotating tube. Inside the chamber 246, the conical inner surface 226 guides the fluid stream to the outermost region of the drum, in a way to minimise turbulence. The centrifugal force created by the rotation of the drum causes separation of the oil and the water in the sludge. Since water is denser than oil, the water moves preferentially to the outer region of the drum and passes out though the holes 252 into the collector device 254, from where it is directed to a collection vessel (not shown) through opening 262. The remainder of the fluid, which by this time contains much less water, passes through the holes 228*b* in plate 228 and back into the interior of the tube 216 through slots 220. From there, the oil passes out through the pipe 214 and is collected. The position of plate 228 can be altered to vary the amount of fluid passing through slots 252. In the embodiment shown, plate 228 can be moved to partially block holes 252, however in other embodiments, the plate can be moved to completely block holes 252.

An apparatus substantially as shown in FIGS. 1 to 4 has been used to separate a 50:50 water:oil mixture. The separated water component has a residual oil content of 18.51 ppm (0.001851%) and the separated oil component had a residual water content of 0.25%.

Alternatively, when the fluid stream comprises heavy particles, the sealing plug 238 can be positioned such that it completely blocks holes 252. When holes 252 are blocked any heavy particles, for example metals particles, are trapped in the drum with the remaining fluid passing through plate 228 and out through the longitudinal tube's outlet end 214. Then with the fluid supply pump shut off but with the drum still rotating the sealing plug 238 can be positioned to open holes 252 to recover any heavy material that has been trapped in the drum.

It has been found that, using the apparatus as described above, good separation of oil from water can be achieved. In order to maximise the separation of water and oil, the speed of rotation of the drum can be varied by simple trial and error until an optimal speed is found.

An apparatus substantially as shown in FIGS. 1 to 4 has also been used to separate sand and grit from water. A slurry of sand in water (approximately 13.4% sand) was subjected to a series of separations carried out at different rotational speeds. Separated sand was collected in the collector 254 whereas water from which sand particles had been removed was collected through outlet 214.

At a rotational speed of 1500 rpm, the water collected through outlet 214 contained 59 mg/ml (0.0059%) residual sand.

At a rotational speed of 1772 rpm, the water collected through outlet 214 contained 46 mg/ml (0.0046%) residual sand.

At a rotational speed of 2250 rpm, the water collected through outlet 214 contained 19 mg/ml (0.0019%) residual sand.

On the basis of the above results, it is envisaged that removal of substantially all of the sand from the water would be achieved at a rotational speed of about 3500 rpm.

The results set out above demonstrate that the apparatus of the invention provides an effective means of separating the components of a fluid stream.

Figure 5:
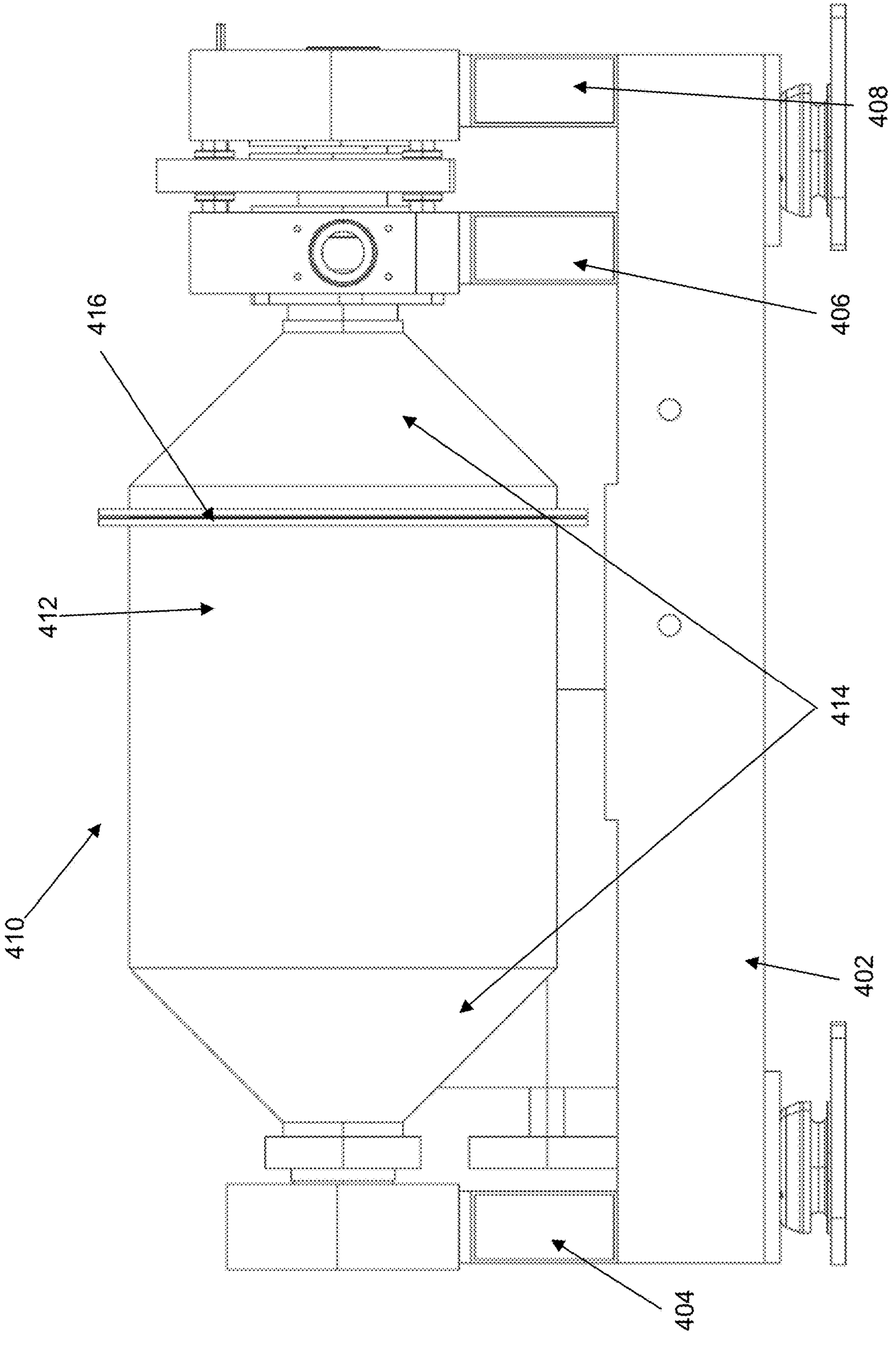
FIG. 5 shows an external side view of an apparatus according to a second embodiment of the invention.
Figure 6:
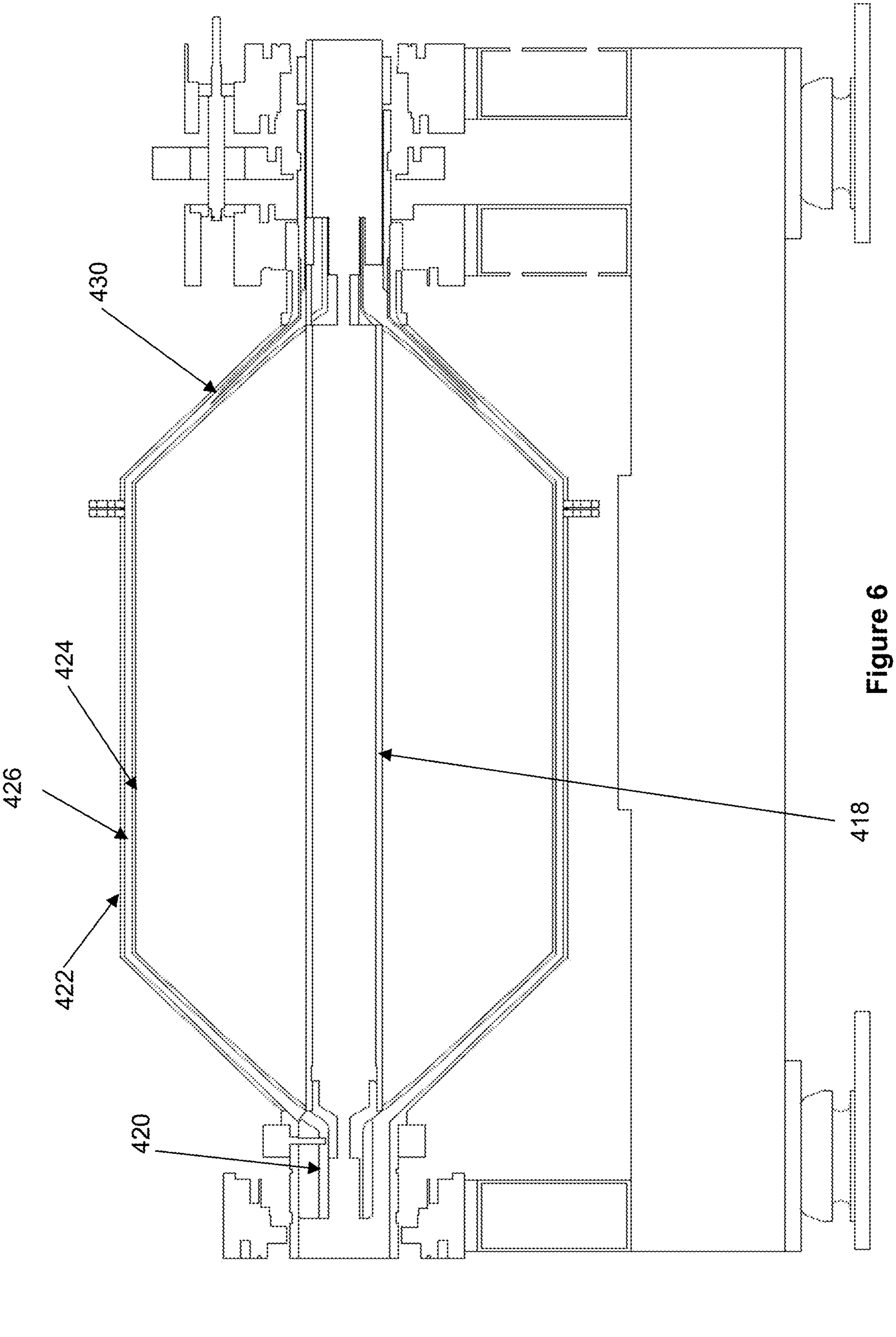
FIG. 6 shows a simplified cross-sectional view of the apparatus shown in FIG. 4.
Figure 7:
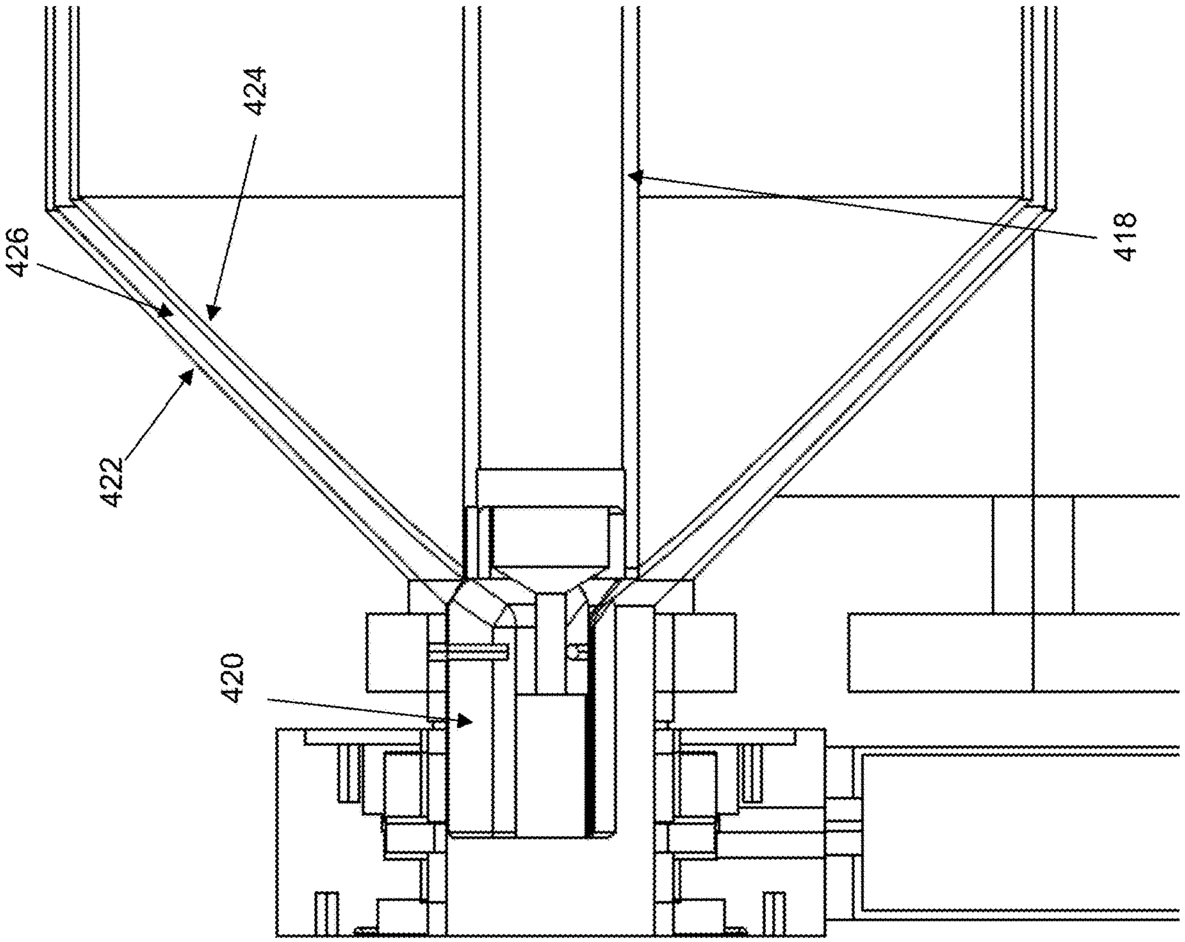
FIG. 7 shows a cross-sectional view of the inlet end of the apparatus shown in FIG. 4.
Figure 8:
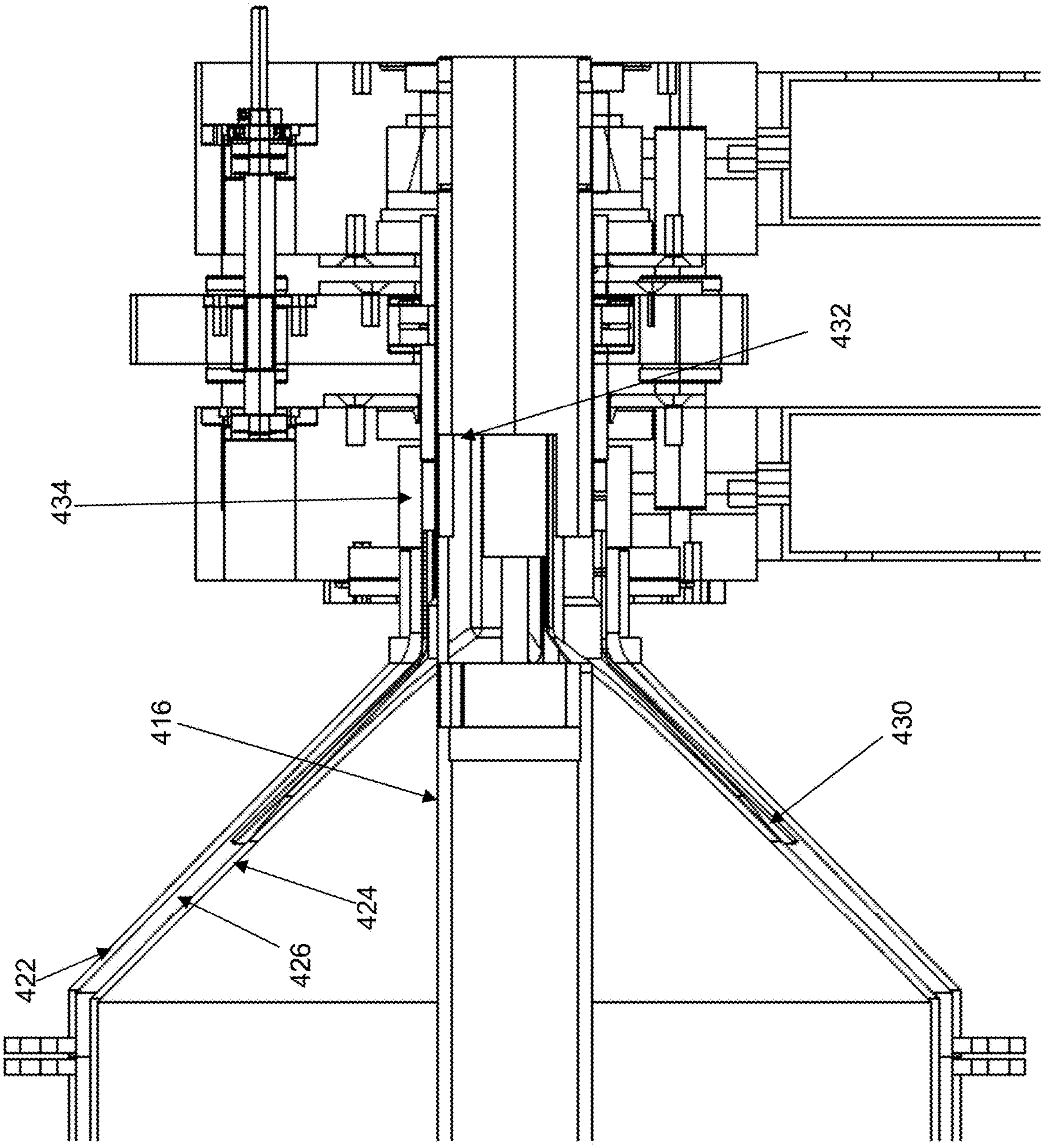
FIG. 8 shows a cross-sectional view of the outlet end of the apparatus shown in FIG. 4.
Figure 9:
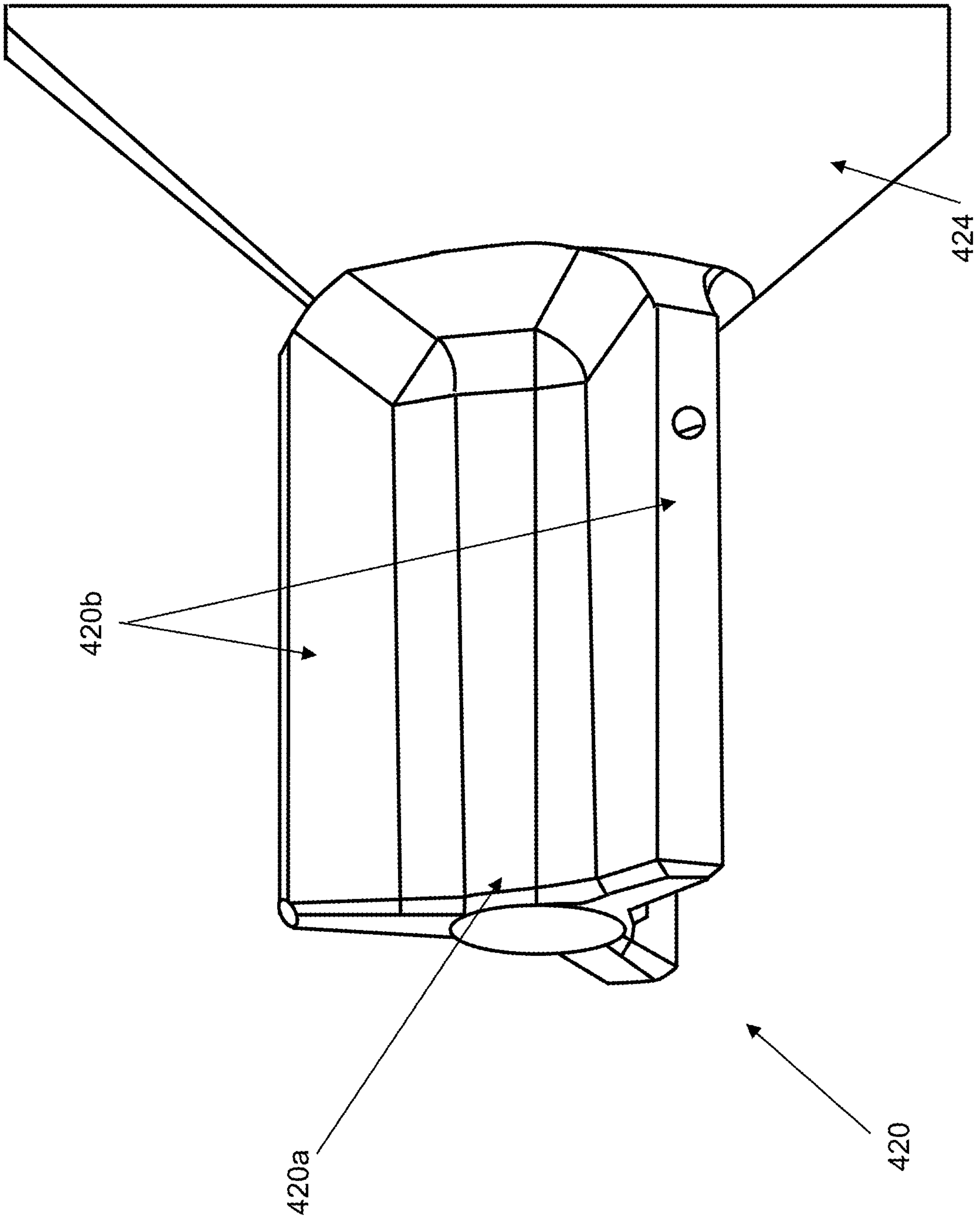
FIG. 9 shows the spider diverter of the apparatus according to the second embodiment of the invention.

An apparatus according to a second embodiment of the invention is illustrated in FIGS. 5 to 9. As shown in FIGS. 5 and 6, the apparatus includes a support structure base 402 and three upstanding support pillars 404, 406, 408.

Mounted on the inwardly facing sides of two of the upstanding support pillars 404, 406 are bearing assemblies, which are of conventional construction. A drum 410 formed from stainless steel extends between the two bearing assemblies. The drum has a cylindrical central section 412 and two conical end portions 414. The drum is formed from two parts. The first part comprises one conical end portion and the majority of the cylindrical section with the second part comprises the other conical end portion and a cylindrical axially extending wall, which forms part of the central cylindrical section when assembled. Each of the two parts comprise a flange at the end of their cylindrical sections and are sealed together by means of one or more sealing clamps 416. At the apexes of each of the two conical end portions is a hollow shaft 418 which engages with the bearing assemblies in the upstanding support pillars 404, 406, 408. The two shaft ends extend into the bearings and are rotatable therein. One end of the hollow shaft is connected to a fluid supply pipe. The outer surfaces of the fluid supply pipe are sealed against the inner surfaces of the hollow shaft.

One of the conical end sections of the drum is provided with a hole through which a fluid to be separated enters the drum (the drum inlet). The other conical end section of the drum is provided with outlets through which a separated or purified fluids exits the drum (the drum outlet).

The drum inlet is connected to a pressurised source of fluid to be separated or purified. Inside the drum inlet there is a spider diverter 420, shown in FIG. 9. The spider diverter 420 takes the form of a tube 420*a* with a number (in this case three) radially extending walls 420*b*. The tube is blocked and serves to prevent fluid from passing through the hollow shaft 418. As the inside of the tube is blocked, fluid entering through the fluid inlet passes between the radially extending walls and are then diverted outwardly by the outer surface of the skin, through the annular channel between the drum wall and the inner wall.

The cylindrical and conical sections of the drum both have a double-skinned arrangement formed by the inner surface 422 of the drum and the outer surface of an inner wall 424. There is therefore an annular channel 426 between the outer surface of the inner wall and the inner surface of the drum wall. The double-skinned arrangement means that the fluid is subjected to maximum centrifugal forces towards the radially outer region of the drum. The drum and inner wall are shaped so that the cross-sectional area along the length of the drum is constant. Therefore, the distance between the inner surface of the drum and the inner wall decreases along the conical section of the drum, as the diameter of the cross-section increases. This means that the fluid can travel through the drum with no change in velocity.

The inner surface of the drum and the outer surface of the skin are both formed from stainless steel and are polished to reduce turbulence being imparted on the separating fluid.

On entering the system, the fluid mix is moved via the spider diverter 420 and the conical inner wall 424 towards the outer diameter of the main separation drum. The angles of the conical sections encourage fluid to the radially outer parts of the drum where centrifugal forces are highest in a low turbulence manner. A pump moves the mix through the separation drum and the centrifugal force causes heavier particles to migrate towards the outer wall 422, leaving lighter particles towards the inner wall.

At the outlet end of the drum there is a diverter cone 430. The diverter cone divides the fluid flow into two. The less dense component of the fluid passes one side (the radially inner side) of the diverter and through the drum outlet. The denser component of the fluid passes the other side (the radially outer side) of the diverter and through a separate outlet positioned perpendicular to the drum outlet.

The diverter cone 430 can be actuated back and forth on the rotational axis of the system to change the division point in the cross section of the flow.

The diverter cone 430 is formed from a blade of stainless steel and is connected to a tubular shaft. The stainless steel blade is polished to minimise turbulence and promote laminar flow of the fluid through the apparatus. The tubular shaft partitions the outlet end of the tube into an inner outflow 432 and an outer outflow 434. The denser component of the fluid stream, having passed the diverter cone on its radially outer side, then passes through outer outflow 434. The less dense component, having passes on the radially inner side of the diverter cone, then passes through inner outflow 432. Both outflows may be directed back to the central area where an arrangement of lip seals and O-ring seals channel the outflows to their respective outlet pipes. Alternatively, the outer outflow 434 directs the denser component of the fluid to an outlet pipe which is angled at approximately perpendicularly to the axis of rotation of the drum and the inner outflow 432 directs the less dense component to another outlet pipe, aligned with the hollow shaft 418.

The drum is mounted on roller bearings (not shown) at each end. Rotation of the drum is driven by a drive belt which engages a pulley that is fastened through the drum fabrication and into the spider diverter 420. The drive belt is linked to an electric motor. Alternatively, the drive belt can be linked to a hydraulic powered turbine or a high-pressure air powered turbine.

In use, a mixture of fluids to be separated (for example, a mixture of oil and water) is pumped into the input, ideally using a low turbulence type of pump (such as a wobble plate piston pump). The drum is then spun at high rotational speed (circa 3,000 rpm) via the belt drive. The spider diverter 420 maintains mechanical continuity through the central tube 418 of the system while permitting fluid entry into the annular channel 426.

The degree of separation and/or purity of the fluids separated by any of the embodiments described herein can be determined by measuring the transparency or optical absorbance of the separated fluids. Based on the determined degree of separation and/or purity of the separated fluids, the separation apparatus can be tuned to maximise separation. The measurement of the degree of separation works on the principle of the clearer the fluid the greater light will pass through a fluid therefore providing a higher reading to a measuring light meter (e.g. a device containing a light dependent resistor which provides a reading based on the amount of light detected). To ensure a consistent light source, LED light sources are used.

Figure 10:
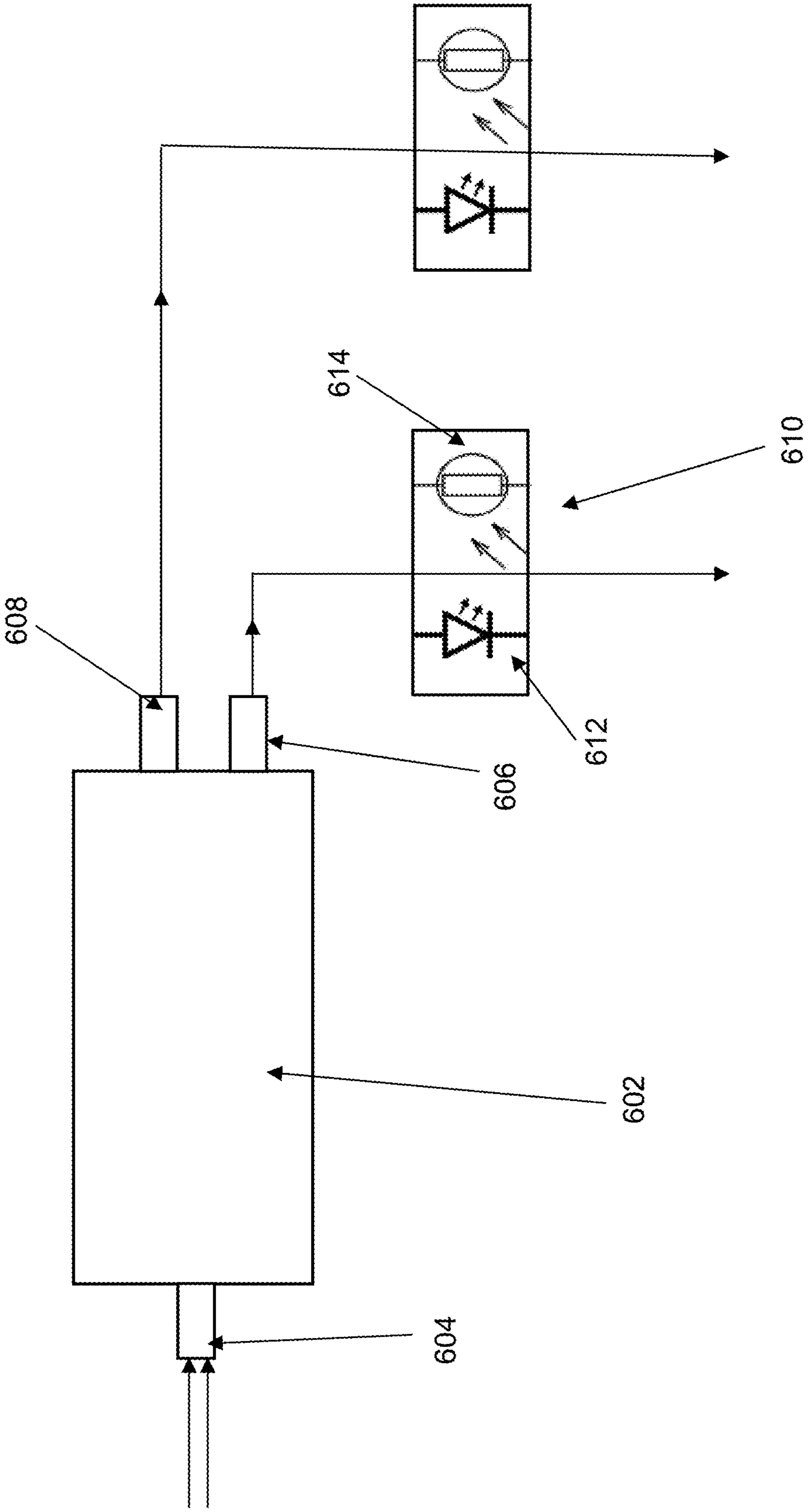
FIG. 10 is a schematic diagram showing a system for determining the extent of separation of two components from a fluid stream.

A schematic diagram of a system to determine the degree of separation of the separated fluids is shown in FIG. 10. Apparatus 602 is provided with inlet 604 for receiving a fluid stream comprising two fluid components, first outlet 606 and second outlet 608. Fluid exiting apparatus 602 through first outlet 606 contains a greater proportion of a first fluid than the inlet fluid. Similarly, fluid exiting the apparatus through second outlet 608 contains a greater proportion of a second fluid than the inlet fluid. Each of the first and second outlets are connected to separate light boxes 610. The light box contains a light source, e.g. a light emitting diode 612 and a light detector, which may be or comprise a light dependent resistor 614. The fluids pass in between the light sources and the light detector. The light box then provides a reading based on the light detected by the light detector.

In order to determine the composition of the separated components of the fluid stream materials, the absorbance of samples with known ratios of the two fluids to be separated can be determined. Then, once the relationship between the absorbance and the ratio of the two fluids is known, the ratio of components the separated fluids can be determined by measuring their absorbance.

Figure 11:
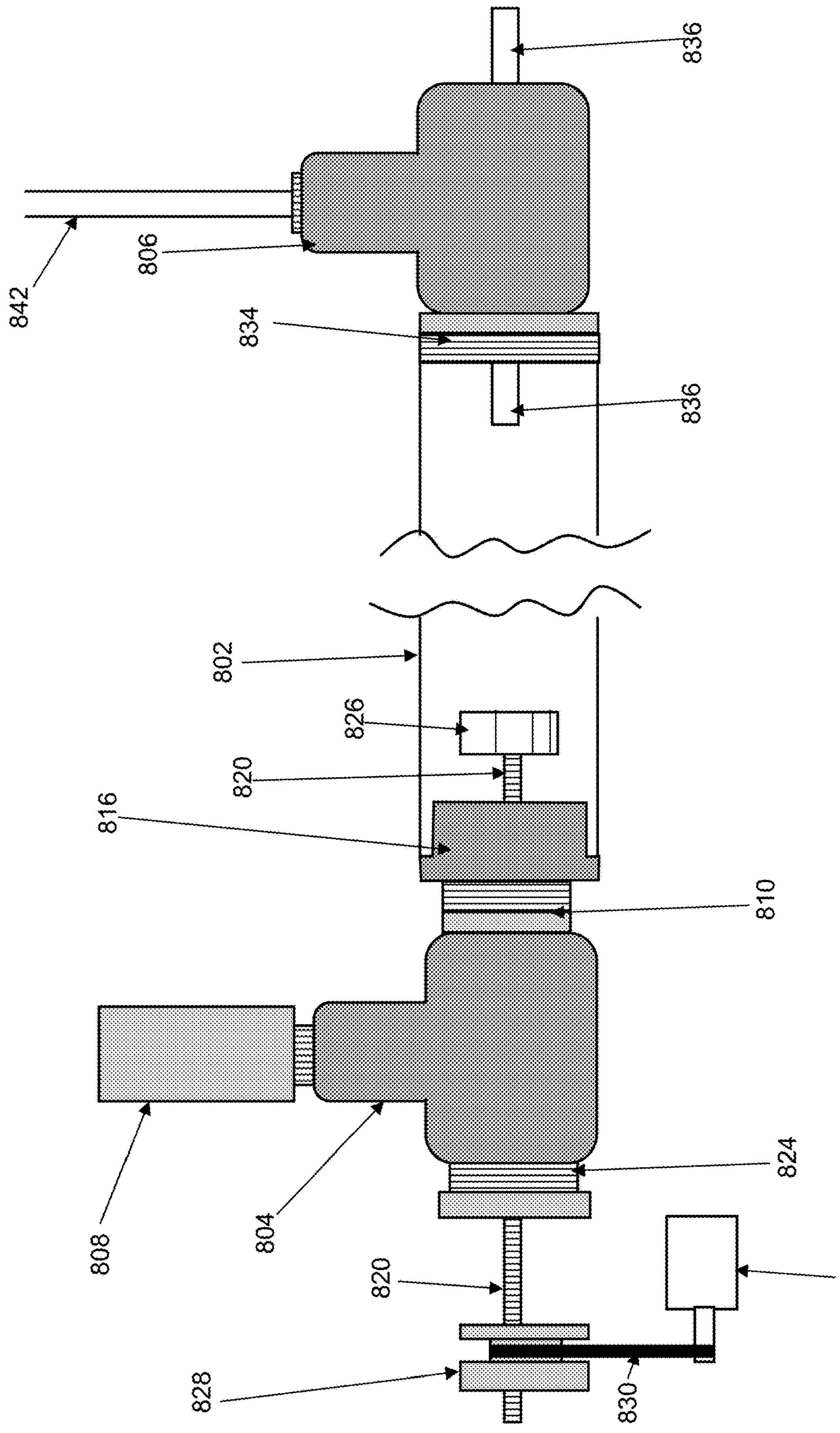
FIG. 11 is a schematic diagram showing a vortex separation device according to one embodiment of the invention.
Figure 12:
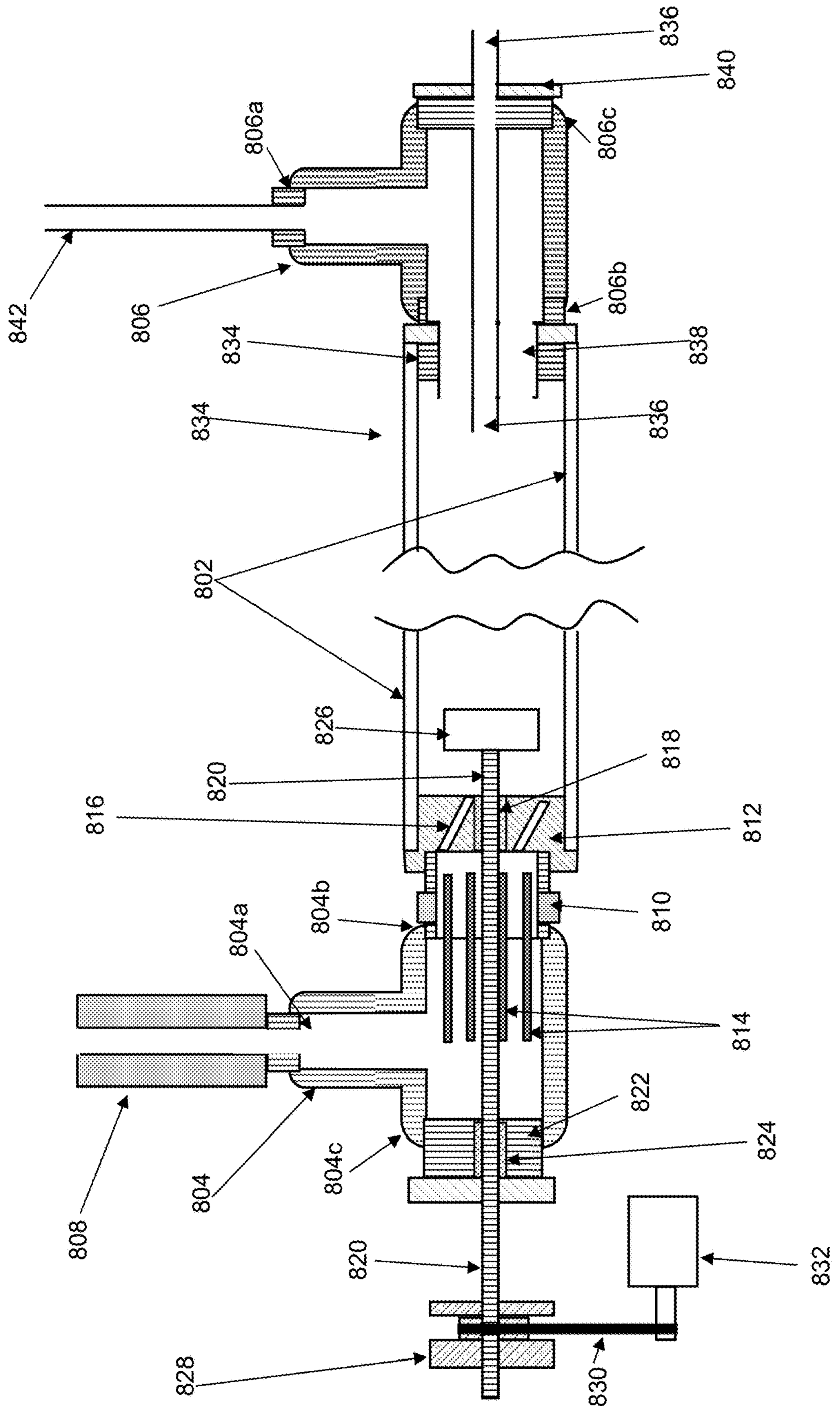
FIG. 12 is a cross-sectional view of the vortex separation device shown in FIG. 11.

FIGS. 11 and 12 show a vortex separation device according to an embodiment of the invention. The vortex separation device may be used either alone or in combination with a further separation device (for example, a centrifugal separation apparatus such as the apparatuses shown in FIGS. 1 to 9).

The vortex separation device comprises a separation tube (802) disposed between an upstream T-connector (804) and a downstream T-connector (806).

Each T-connector (804, 806) has a pair of coaxial longitudinally aligned end openings and a perpendicular (with respect to the longitudinal openings) lateral opening. These openings serve as the connector inlets or outlets. The three openings of the T-connectors (804, 806) are internally threaded to allow connection with other components of the vortex separation device The lateral opening (804*a*) on the upstream T-connector is connected by means of its internal thread to an externally threaded end of a tubular member (808) which in turn is connected to a pressurised fluid source. The lateral opening (804*a*) on the upstream T-connector therefore serves as a fluid inlet.

A first end opening (804*b*) of the upstream T-connector (804) serves as an outlet for the T-connector. The outlet is internally threaded for connection with an externally threaded first double-ended tubular spigot (810). Fluid passes from the outlet of the upstream T-connector through the first double-ended tubular spigot (810) and then onward to a circular vortex-inducing plate (812).

The first double-ended tubular spigot (810) has a central portion and two externally threaded end portions. One of the externally threaded end portions engages with the outlet of the upstream T-connector (804*b*), whilst the other engages with a threaded bore of the circular vortex-inducing plate (812).

A fluid to be separated enters the vortex separation device via the upstream T-connector (804) and passes through a series of parallel channels. Within the first double-ended tubular spigot there are a number of guide walls (814) which define the parallel channels. The guide walls (814) may be made from a metal or plastics material, which is sufficiently rigid so as not to deform as the fluid stream passes through the double-ended spigot (810).

Figure 13B:
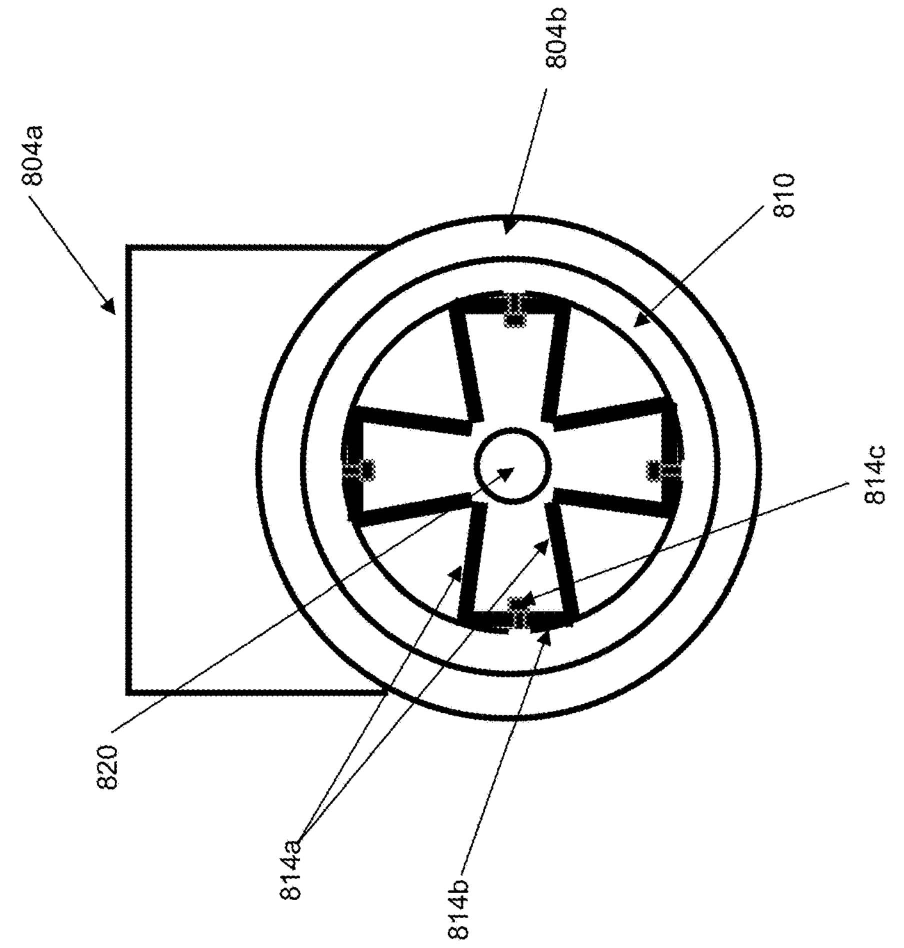
FIGS. 13A and 13B shows the arrangement of the guide walls within the first double-ended spigot in two separate embodiments of the invention.
Figure 13A:
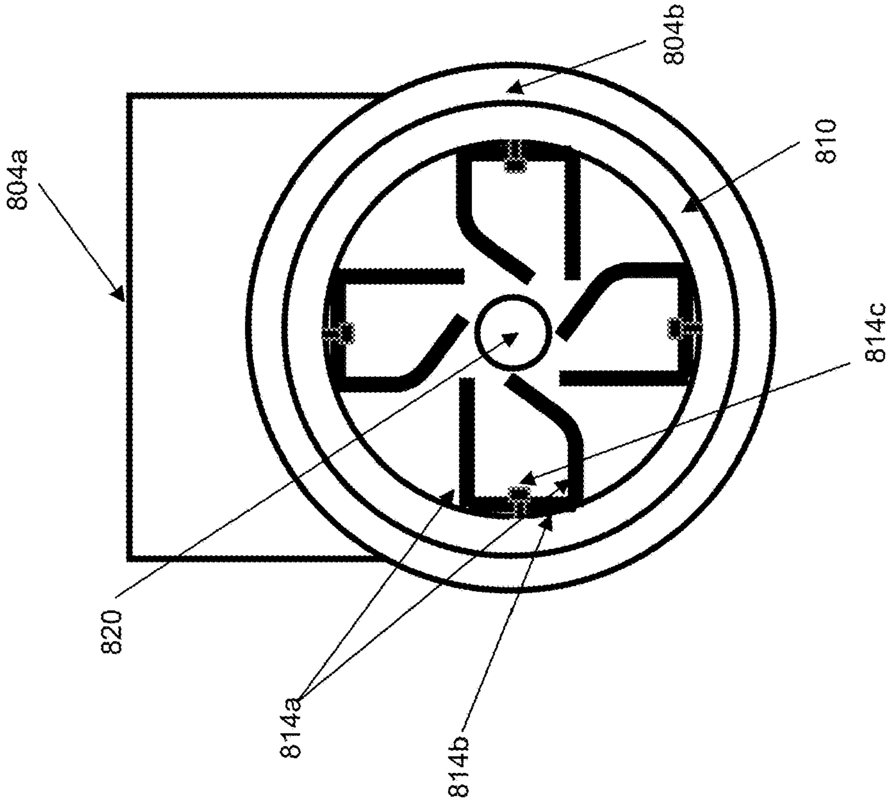

In example of the arrangement of the guide walls (814) within the upstream T-connector (804) is shown in FIG. 13A.

The guide walls (814) have a substantially U-shaped cross-section and have a base portion (814*b*) and two substantially perpendicular arms or side walls (814*a*) at each side of the base portion. One of the arms (814*a*) of each guide wall is bent to provide clearance for the rotating drive shaft (820). The two arms or side walls (814*a*) and the base (814*b*) define a channel with an open side, which faces away from the interior wall of the first double-ended spigot (810). The guide walls are attached (for example, by means of screws/rivets (814*c*)) to the interior wall of first double-ended spigot (810) equidistantly around its inner circumference.

An alternative arrangement of the guide walls (814) is shown in FIG. 13B.

In this arrangement, the guide walls (814) have a substantially U-shaped cross-section and have a base portion (814*b*) and two converging arms or side walls (814*a*) at each side of the base portion. The two arms (814*a*) and the base (814*b*) define a channel with an open side, which faces the centre of the first double-ended spigot (810). The guide walls are attached (for example, by means of screws/rivets (814*c*)) to the interior wall of first double-ended spigot (810) equidistantly around its inner circumference.

In FIGS. 13A and 13B, screws/rivets (814*c*) are used to secure the guide walls to the interior of the first double-ended spigot (810). However, it will be appreciated that in practice, the screws/rivets may be countersunk into the first double-ended spigot (810) in order to further reduce the turbulence of the fluid stream passing through the first double-ended spigot (810). Alternatively, the guide walls can be fixed to the interior wall of the double-ended spigot using other fastenings/adhesives.

When a drive shaft (820) is present, the guide walls (814) are arranged to provide a central space through which the drive shaft can pass (as shown in FIGS. 13A and 13B).

The guide walls (814) collimate the fluid before it passes through a vortex-inducing plate or fan.

The vortex inducing plate which causes rotation of the fluid to form a vortex. Due to the centrifugal forces operating on the components of the fluid, as the fluid passes through the separator tube (802), the denser component(s) of the fluid are forced to the outer regions of the separator tube, whilst the less dense components accumulate at or close to the longitudinal axis of the separator tube. The denser component then passes through a radially outer annular collector channel (838) and is directed out of the vortex separator via a lateral opening on the downstream T-collector (806*a*). The less dense component passes through the radially inner central inner collector tube (836).

Figure 14B:
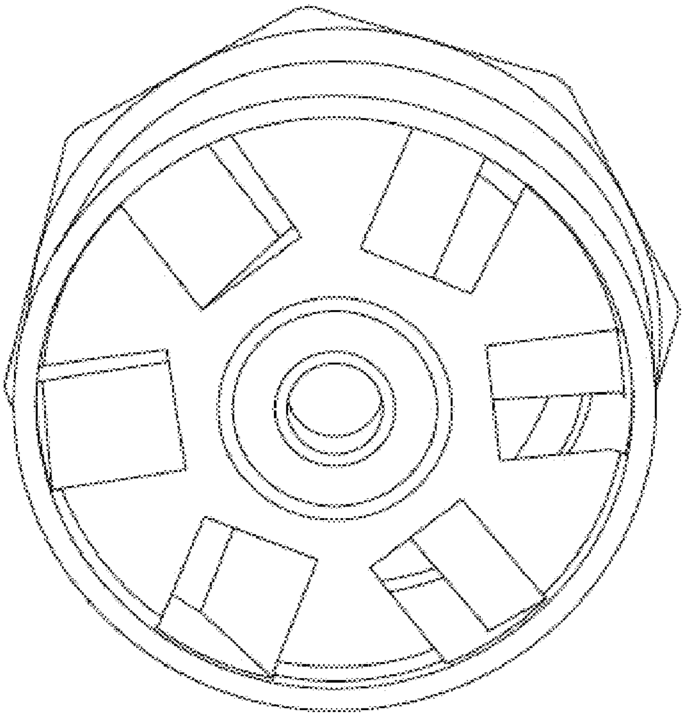
FIGS. 14A and 14B show the two sides of the vortex inducing plate.
Figure 14A:
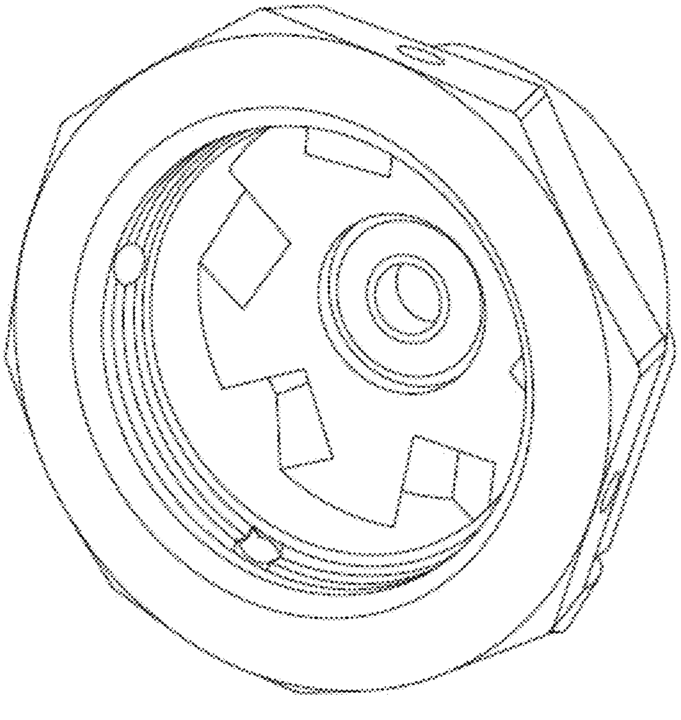

As shown in FIG. 14A, on one side, the vortex-inducing plate (812) has a circular, internally threaded bore for connection with the first double-ended spigot (810). As shown in FIG. 14B, on its other side, the vortex-inducing plate (812) is provided with several (e.g. six) angled conduits (816) spaced equally around the plate and positioned such that fluid passing through the channels is formed into a vortex. The conduits extend through the plate and through the base of the bore.

The vortex-inducing plate (812) also has a central opening, which is fitted with a bearing (818) through which a drive shaft (820) can pass and freely rotate. As the fluid passes through the angled conduits in the vortex-inducing plate (812), the fluid stream is rotated to form a vortex.

The use of the vortex-inducing plate (812) is particularly useful when the fluid stream to be separated comprises a mixture of oil and water.

A second longitudinal opening (804*c*) of the upstream T-connector (which is positioned opposite the first longitudinal opening) is sealed with a first plug (822). The first plug comprises an externally threaded spigot and a cap having a diameter at least as large as the externally threaded spigot. The first plug also has a central hole, fitted with a bearing (824), through which the threaded drive shaft (820) passes. The drive shaft (820) is able to rotate within the first plug (822).

The drive shaft (820) passes from the outside of the upstream T-connector, through the first plug (822) and upstream T-connector (804) and into the separator tube (802).

At the end of the shaft located inside the separator tube (802), an impeller (826) is non-rotatably mounted onto the drive shaft.

The impeller (826) has a central hub with a plurality (e.g. six) blades radiating outwardly from the hub. The hub also has a threaded central hole to allow the impeller (826) to be threaded onto the drive shaft (820).

At an end of the shaft which protrudes from the first plug (822), a pulley wheel (828) is non-rotatably mounted on the shaft. The pulley wheel (828) has a circumferential groove about which a drive belt (830) can be located. The drive belt (830) is connected to an electric motor (832) and the motor can thereby drive rotation of the drive shaft (820) and the impeller (826).

The fluid, which has already passed through the vortex-inducing plate (812), is therefore further rotated by the impeller (826) to increase the rotational velocity of the fluid.

As the fluid travels down the separator tube (802), due to its rotation and the centrifugal forces acting upon it, separation of the fluid takes place. The denser component(s) of the fluid stream accumulate at the outer regions of the separator tube (802) whilst the less denser component(s) accumulate at the inner regions of the separator tube (802).

The downstream end of the separator tube (802) is connected to one of the longitudinal openings of the downstream T-connector (806*b*) by a second double ended-spigot (838). The second double ended spigot (838) is tubular and has a central portion and two end portions. The end portions may be threaded or ribbed to so that a water-tight connection may be made with the tubular pipe (802) and the downstream T-connector (806).

The other longitudinal opening of the downstream T-connector (806*c*) is sealed with a second plug (840). The second plug (840) comprises an externally threaded spigot and a cap having a diameter at least as large as the externally threaded spigot. The second plug (840) has a central hole through which a central inner collector tube (836) can pass. The inner collector tube (836) extends from the interior of the separation tube (802), through the downstream T-connector (806) and out through the second plug (840). This inner collector tube serves as a first outlet, i.e. an outlet for the denser component of the fluid stream.

Around the inner collector tube (836) there is an annular channel (838) which serves as an outlet for the denser component of the fluid stream. The annular channel (838) is in fluid communication with an outlet pipe (842) in lateral opening (806*a*) on the downstream T-connector, which serves as a second outlet, i.e. an outlet for the less dense component.

The outlet pipe (842) and inner collector tube (836) may be provided with valves (not shown) which can be opened or closed to control release of the separated fluid components from the vortex separation device.

The vortex separation device described above is particularly useful for separating a fluid stream comprising oil and water.

In another embodiment, in the vortex separation device described above, the vortex-inducing plate may be replaced with a bladed impeller. This embodiment is particularly useful for separating a fluid stream comprising water and sand. As the difference if density between water and sand is greater than for water and oil, the impeller, drive shaft and motor may not be required for efficient separation and may therefore be omitted from the device. A shaft may still be present and be non-rotatably fixed to the device. The bladed impeller may be non-rotatably mounted on or attached to the shaft.

In yet a further embodiment, in the vortex separation device described above, the vortex-inducing plate is removed and instead the ends of the guide walls are bent at an angle of 45°. The guide walls themselves serve to introduce a vortex to the fluid stream. Again, this embodiment is particularly useful for separating a fluid stream comprising water and sand. As the difference if density between water and sand is greater than for water and oil, the impeller, drive shaft and motor may not be required for efficient separation and may therefore be omitted from the device.

Using the vortex separation device of this embodiment (having the bent guide walls and without the impeller, drive shaft or motor). A mixture of 2.61% by weight of fine white sand (grain size of <200 μm) and water was passed through the vortex separation device described above. The motor was set to drive the impeller at 1600 rpm. The water obtained from output (806) of the vortex separation device contained sand at a level of 6 ppm.

The vortex separation device can be used in combination with the centrifugal separation devices described herein (for example, those substantially as shown in FIGS. 1 to 9). As shown above, an apparatus substantially as shown in FIGS. 1 to 4 can be used to provide water having a sand content of 19 ppm to 59 ppm. This water stream can then be passed through the vortex separation device substantially shown in FIGS. 11 to 12 to further reduce the sand content down to 6 ppm. Similarly, the vortex separation device can be used to further separate an oil and water mix that has been at least partially separated by a centrifugal separation device substantially as shown in FIGS. 1 to 9. The embodiments described above and illustrated in the accompanying figures and tables are merely illustrative of the invention and are not intended to have any limiting effect. It will readily be apparent that numerous modifications and alterations may be made to the specific embodiments shown without departing from the principles underlying the invention. All such modifications and alterations are intended to be embraced by this application.

The invention claimed is:

1. A centrifugal separator apparatus for separating components of a fluid stream;

the apparatus comprising a support structure and a centrifugal separator unit rotatably mounted on the support structure so as to be rotatable about a rotational axis extending through the centrifugal separator unit;

a drive element for driving rotation of the centrifugal separator unit;

wherein the centrifugal separator unit comprises a centrifugal separation chamber having an inlet which is connected or connectable to a source of fluid requiring separation, a first outlet for collecting a higher density component of the fluid stream, and a second outlet for collecting a lower density component of the fluid stream;

the first outlet being connected or connectable to a first collector for collecting the higher density component and the second outlet being connected or connectable to a second collector for collecting the lower density component;

the centrifugal separation chamber comprising a curved or inclined guide surface for guiding flow of the fluid from the inlet in a radially outward direction;

wherein the centrifugal separator unit is provided with a wall member which is axially movable to provide a selected degree of occlusion of the first outlet and thereby control flow of the higher density component through the first outlet; and wherein the apparatus further comprises a tubular or part-tubular central shaft which passes through the centrifugal separator unit and is rotatably mounted on the support structure and the centrifugal separation chamber inlet may take the form of a first set of lateral openings in a first end of the central shaft.

2. An apparatus according to claim 1 wherein the first collector comprises a circumferential channel-shaped manifold surrounding the centrifugal separator unit so as to receive separated fluid components emerging from the first outlet.

3. An apparatus according to claim 2 wherein the manifold is fixed and does not rotate with the centrifugal separator unit and there is a gap between the edges of the manifold and an outer surface of the centrifugal separator unit to provide a fan or labyrinth seal.

4. An apparatus according to claim 3 wherein the separator unit is constructed to provide a pressure differential between the interior of the manifold and the exterior so that air passes into the manifold and the passage of separated fluid components out through the gap is prevented.

5. An apparatus according to claim 1 wherein the guide surface is conical or frusto-conical and/or positioned at a radially outward position with respect to the inlet and/or downstream of the inlet.

6. An apparatus according to claim 1 wherein the wall member serves to increase or reduce the size of the first outlet.

7. An apparatus according to claim 1 wherein the guide surface is positioned downstream of the inlet and the wall member comprises a divider blade which divides the fluid stream into inner and outer streams, wherein the outer stream comprises the higher density components of the fluid and the inner stream comprises the lower density components of the fluid.

8. An apparatus according to claim 1 wherein the first set of lateral openings are elongate and angled.

9. An apparatus according to claim 1 wherein the support structure comprises mounting units in which the central shaft is rotatably mounted and wherein the mounting units are or comprise labyrinth seals.

10. An apparatus according to claim 1 comprising a detector for determining the extent of separation of components of the fluid stream.

11. A centrifugal separation apparatus according to claim 1 further comprising:

a downstream vortex separation device for separating components of a fluid stream comprising:

a separator unit in which separation of the fluid occurs;

a fluid inlet for introducing a pressurised source of the fluid to be separated into the separator unit;

one or more channels for reducing turbulence in the fluid stream; and a vortex-creating device for introducing a vortex to the fluid stream; and a conduit for connecting an outlet of the centrifugal separation apparatus to the fluid inlet of the vortex separation device.

12. An apparatus according to claim 1 wherein the second outlet takes the form of a second set of lateral openings in the central shaft positioned upstream of the wall member.

13. An apparatus according to claim 12 wherein the apparatus further comprises a third set of lateral openings in the central shaft positioned downstream of the wall member.

14. A centrifugal separator apparatus for separating components of a fluid stream;

the apparatus comprising a support structure and a centrifugal separator unit rotatably mounted on the support structure so as to be rotatable about a rotational axis extending through the centrifugal separator unit;

a drive element for driving rotation of the centrifugal separator unit;

wherein the centrifugal separator unit comprises a centrifugal separation chamber having an inlet which is connected or connectable to a source of fluid requiring separation, a first outlet for collecting a higher density component of the fluid stream, and a second outlet for collecting a lower density component of the fluid stream;

the first outlet being connected or connectable to a first collector for collecting the higher density component and the second outlet being connected or connectable to a second collector for collecting the lower density component;

the centrifugal separation chamber optionally comprising a curved or inclined guide surface for guiding flow of the fluid from the inlet in a radially outward direction;

and the centrifugal separator unit optionally being provided with a wall member which is axially movable to provide a selected degree of occlusion of the first outlet and thereby control flow of the higher density component through the first outlet;

wherein the first and/or the second outlets are in fluid communication with one or more detectors for determining the extent of separation of the components of the fluid; and wherein the apparatus further comprises a tubular or part-tubular central shaft which passes through the centrifugal separator unit and is rotatably mounted on the support structure and the centrifugal separation chamber inlet may take the form of a first set of lateral openings in a first end of the central shaft.

15. The method of claim 14, wherein the wall member is present, and wherein the second outlet takes the form of a second set of lateral openings in the central shaft positioned upstream of the wall member.

16. An apparatus according to claim 15 wherein the apparatus further comprises a third set of lateral openings in the central shaft positioned downstream of the wall member.

* * * * *